United States Patent
Kim et al.

(10) Patent No.: US 8,427,942 B2
(45) Date of Patent: Apr. 23, 2013

(54) METHOD, APPARATUS, AND SYSTEM FOR CONNECTING A MOBILE CLIENT TO WIRELESS NETWORKS

(75) Inventors: Kyu-Han Kim, Redwood City, CA (US); Dhruv Gupta, Davis, CA (US); Jatinder Pal Singh, Mountain View, CA (US); Alexander Min, Ann Arbor, MI (US)

(73) Assignee: Deutsche Telekom AG, Bonn (DE)

( * ) Notice: Subject to any disclaimer, the term of this patent is extended or adjusted under 35 U.S.C. 154(b) by 324 days.

(21) Appl. No.: 12/793,387

(22) Filed: Jun. 3, 2010

(65) Prior Publication Data
US 2011/0299422 A1 Dec. 8, 2011

(51) Int. Cl.
*H04W 4/00* (2009.01)
*H04W 72/00* (2009.01)

(52) U.S. Cl.
USPC .......................... 370/229; 370/328; 455/452.2

(58) Field of Classification Search .................. 370/229, 370/241, 252, 253, 328, 329, 341, 400; 455/450–453
See application file for complete search history.

(56) References Cited

U.S. PATENT DOCUMENTS

| | | | | |
|---|---|---|---|---|
| 2002/0110105 | A1* | 8/2002 | Awater et al. | 370/338 |
| 2009/0068970 | A1 | 3/2009 | Ahmed et al. | |
| 2009/0098869 | A1* | 4/2009 | Torrance et al. | 455/426.1 |
| 2009/0131081 | A1 | 5/2009 | Abdel-Kader et al. | |
| 2009/0312014 | A1* | 12/2009 | Su et al. | 455/432.1 |

FOREIGN PATENT DOCUMENTS

| | | |
|---|---|---|
| EP | 1858200 A1 | 11/2007 |
| EP | 1942688 A1 | 7/2008 |

OTHER PUBLICATIONS

Abusubaih et al., Interference-Aware Decentralized Access Point Selection Policy for Multi-Rate IEEE 802.11 Wireless LANs, Proceedings of the IEEE PIMRC, 2008.

Akyildiz et al., A Survey on Wireless Mesh Networks, Georgia Institute of Technology.

Athanasiou et al., A Cross-Layer Framework for Association Control in Wireless Mesh Networks, IEEE Transactions on Mobile Computing, vol. 8, 2009.

Bahl et al., Cell Breathing in Wireless LANs: Algorithms and Evaluation, Mobile Computing, IEEE Transactions on, vol. 6, pp. 164-178, 2007.

Balachandran et al., Hot-Spot Congestion Relief and Service Guarantees in Public-Area Wireless Networks, SIGCOMM Comput. Commun. Rev., vol. 32, 2002.

Bejerano et al., Fairness and Load Balancing in Wireless LANs Using Association Control, IEEE/ACM Trans. Netw., vol. 15, 2007.

Berg et al., On Selfish Distributed Access Selection Algorithms in IEEE 802.11 Networks, Proceedings of IEEE VTC, 2006.

Brickley et al., Load Balancing for QoS Optimization in Wireless LANs Utilizing Advanced Cell Breathing Techniques, Proceedings of the IEEE VTC, 2005.

Campista et al., Routing Metrics and Protocols for Wireless Mesh Networks, Network, IEEE; vol. 22, 2008.

(Continued)

*Primary Examiner* — Kerri Rose
(74) *Attorney, Agent, or Firm* — Leydig, Voit & Mayer, Ltd.

(57) ABSTRACT

A method for connecting a mobile client to a wireless network includes periodically triggering an access point scanning process so as to monitor an access point density of a wireless network. A frequency of the triggering is adjusted in response to a change in the access point density.

18 Claims, 19 Drawing Sheets

OTHER PUBLICATIONS

Clausen et al., Optimized Link State Routing Protocol (OLSR), IEEE 802.11 k draft, obtained at http://www.ietf.org/rfc/rfc3626.txt.

Clausen et al., Optimized Link State Routing Protocol (OLSR), The Expected Transmission Count (ETX) metric, obtained at http://www.ietf.orglrfc/rfc3626.txt.

Draves et al., Routing in Multi-Radio; Multi-Hop Wireless Mesh Networks, Proceedings of the 10th Annual International Conference on Mobile Computing and Networking, pp. 114-128, 2004.

Feeney et al., Investigating the Energy Consumption of a Wireless Network Interface in an Ad Hoc Networking Environment, IEEE infocom, 2001.

Goertzel, An Algorithm for the Evaluation of Finite Trigonometric Series, The American Mathematical Monthly, vol. 65, pp. 34-35, 1958.

Judd et al., Fixing 802.11 Access Point Selection, Computer Communication Review, vol. 32, 2002.

Lee et al., Available Bandwidth-Based Association in IEEE 802.11 Wireless LANs, Proceedings of ACM MSWiM, Vancouver, Canada, Oct. 2008.

Lu et al., Localized Access Point Selection in Infrastructure Wireless LAN, Proceeding of IEEE MILCOM, 2007.

Mangold et al., IEEE 802.11k: Improving Confidence in Radio Resource Measurements, Proceedings of IEEE PIMRC, 2005.

Murty et al., Designing High Performance Enterprise Wi-Fi Networks, Proceeding of USENIX NSDI, 2008.

Nicholson et al., BreadCrumbs: Forecasting Mobile Connectivity, Proceedings of the ACM MobiCom, Sep. 2008.

Nicholson et al., Improved Access Point Selection, Proceedings of the ACM MobiSys, 2006.

Pang et al., Wifi-Reports: Improving Wireless Network Selection with Collaboration, Proceedings of the ACM MobiSys, 2009.

Qiu et al., Physical Pseudo Random Function in Radio Frequency Sources for Security, Technical report, Stanford University, Feb. 2009.

Shalunov, Thrulay, Network Capacity Tester, Thrulay's method, obtained at http://shlang.com/thrulay.

Sundaresan et al., The Need for Cross-Layer Information in Access Point Selection Algorithms, Proceedings of the IMC, 2006.

Vasudevan et al., Facilitating Access Point Selection in IEEE 802.11 Wireless Networks, Proceedings of the IMC, 2005.

Villegas et al., Load balancing in WLANs through IEEE 802.11 k Mechanisms, Proc. of the IEEE ISCC, 2006.

Wang et al., Joint Effects of Radio Channels and Node Mobility on Link Dynamics in Wireless Networks, Proc. of IEEE Infocom, Apr. 2008.

European Patent Office, International Search Report in International Patent Application No. PCT/EP2011/002721 (Nov. 15, 2011).

* cited by examiner

SENSING DURING DISCONNECTION (1) Movement Estimation Stage ($T_m$)
  1: Turn on the accelerometer for 1s and estimate user activity
  2: Update the traveled distance ($\widehat{d}$) using Eq. (4)

(2) Scanning Decision Stage ($T_d$)
  3: if ($\widehat{d} > d_{th}$) then // $d_{th}$ is computed using Eq. (5)
  4:    Perform Wi-Fi scanning
  5:    $\Omega \leftarrow$ set of APs detected by scanning
  6:    Reset the distance: $\widehat{d} \leftarrow 0$
  7: end if

(3) Association (or Update) Stage ($T_a$)
  8: Update the average number of APs $E[n_{ap}]$ using the EWMA and update $d_{th}$
  9: if $|\Omega| \neq 0$ then
 10:    for each AP $i \in \Omega$ do
 11:      Calculate the end-to-end bandwidth
 12:    end for
 13:    Associate with AP that provides the highest end-to-end bandwidth
 14: else
 15:    Go to (1)
 16: end if

FIG. 4B

SENSING DURING CONNECTION (1) Migration Control Procedure
1: if $RSS < RSS_{thr}$ then
2:  if $\text{rnd}() < P_{scan}$ then
3:   Perform AP scanning
4:   Update AP density using EWMV
5:   if $|\Omega| > 0$ then
6:    Estimate the end-to-end bandwidth for top three APs
7:    Associate with the best AP
8:   else
9:    Enters to disconnection mode (Algorithm 1)
10:   end if
11:  end if
12: end if

(2) Threshold Adaptation Procedure
13: Reset the threshold: $RSS_{thr} \leftarrow RSS_{base}+$ Average AP Densiry
14: for each Movement estimation period do
15:  Estimate user movement based on accelerometer reading
16:  if movement(s) exists then
17:   Update the estimated travel distance $\hat{d}$
18:   $P_{scan} = 0.1 + \min\left\{\lfloor \frac{\hat{d}}{d_{unit}} \rfloor \times \Delta, 0.9\right\}$
19:  end if
20: end for

FIG. 4C

Access Point Selection

---

AP ← ap_scan()
FOR EACH *ap* ε AP
    $Rank_{AP}$ = get_ap_info(ap)
    $Rank_{path}$ = get_path_info(ap)
    $Rank_{load}$ = get_load_info(ap)
    $AP_{score} = \omega_1 \times (Rank_{AP} + Rank_{path}) + \omega_2 \times Rank_{load}$
END FOR
Associate with *ap* with best $AP_{score}$ Function get_ap_info(ap)
    μ ← Channel Utilization
    C ← Capacity
    Return (1 - μ) x C Function get_path_info(ap)
    Return $ETX_{Path}$ Function get_load_info(ap)
    FOR EACH *node* along path *P* from *ap* to gateway
        Return *node* with max utilization
    END FOR

METHOD, APPARATUS, AND SYSTEM FOR CONNECTING A MOBILE CLIENT TO WIRELESS NETWORKS

FIELD

The present invention is related in general to wireless networking and in particular to a method, apparatus, and system for providing a mobile client with wireless connections so as to optimize energy conservation, wireless access opportunity and end-to-end performance.

BACKGROUND OF THE INVENTION

With the increasing popularity of Internet enabled mobile devices, and a plethora of mobile web applications in use, the data consumption on smartphones has sky-rocketed over the past years. Many carriers have reported a staggering increase in mobile data traffic. While the flat rate plans in countries including the US tend to come with a maximum data limit, users across the globe continue to be enrolled in usage-based plans.

Wi-Fi based wireless mesh networks present a high bandwidth, and often cheaper, alternative to mobile Internet users, and a good option for service providers to offload the mobile data traffic. For satisfactory user experience, mobile Internet applications such as the delay sensitive Voice-over-IP, warrant seamless connectivity in areas with wireless coverage. However, this is taxing on the mobile phone battery owing to reconnections needed because of user mobility, and short transmission range of Wi-Fi networks. Specifically, to maximize the usage of Wi-Fi opportunities, mobile hosts have to (i) frequently scan ISM spectrum bands to obtain a list of available Wi-Fi networks, (ii) actively probe the wireless links to identify the best access network or access point (AP), and (iii) proactively migrate their current association to other APs that provide high throughput. All of these tasks are critical to both battery lifetime and connectivity of mobile hosts.

There are several inherent challenges in maximizing the utility of Wi-Fi usage for battery constrained mobile clients. Periodic scanning of Wi-Fi networks can help identify available networks. It is challenging to determine optimal scanning frequency to optimize battery lifetime and Wi-Fi connectivity opportunities. Cellular-assisted distance-based scanning provided by existing cellular service providers suffers from unpredictability of cellular signals or varying density of cell towers. Some existing devices utilizes received signal strength (RSS) based scanning, which relies on to a fixed threshold in triggering AP scanning, is not flexible enough to take advantage of diverse Wi-Fi access opportunities offered by the wireless mesh networks. Still some exiting devices utilize history-based scanning and association control, which require energy-intensive computations and location tracking.

In a wireless mesh network (WMN), a mobile client is able to hear from multiple APs belonging to the network and selects one of the APs to access the WMN. It is therefore desired to select an AP that provides the mobile client with optimal user experience or performance. Existing systems primarily utilize a signal strength based mechanism for ranking APs, where a mobile client is associated with the AP that provides the maximum received signal strength (RSS) at the client.

However, selecting APs merely on the basis of signal strength can cause increased congestion at the selected APs, thereby resulting in poor performance for the end users. Moreover, signal strength is not an accurate indicator of channel conditions in a wireless network. Therefore, even if the received signal strength from an AP is high, it may not correctly indicate the current performance level of that AP.

SUMMARY

In an embodiment, the present invention provides a method for connecting a mobile client to a wireless network. The method includes periodically triggering an access point scanning process so as to monitor an access point density of a wireless network, and adjusting a frequency of the triggering in response to a change in the access point density.

BRIEF DESCRIPTION OF THE DRAWINGS

FIG. 4B shows a further embodiment of the method for triggering the access point sensing process when the mobile client is disconnected from a wireless network;

FIG. 4C depicts a further embodiment of the method for triggering the access point sensing process when the mobile client is connected to a wireless network;

FIG. 5B shows a further embodiment of the method depicted in FIG. 4B;

DETAILED DESCRIPTION

Figure 1:
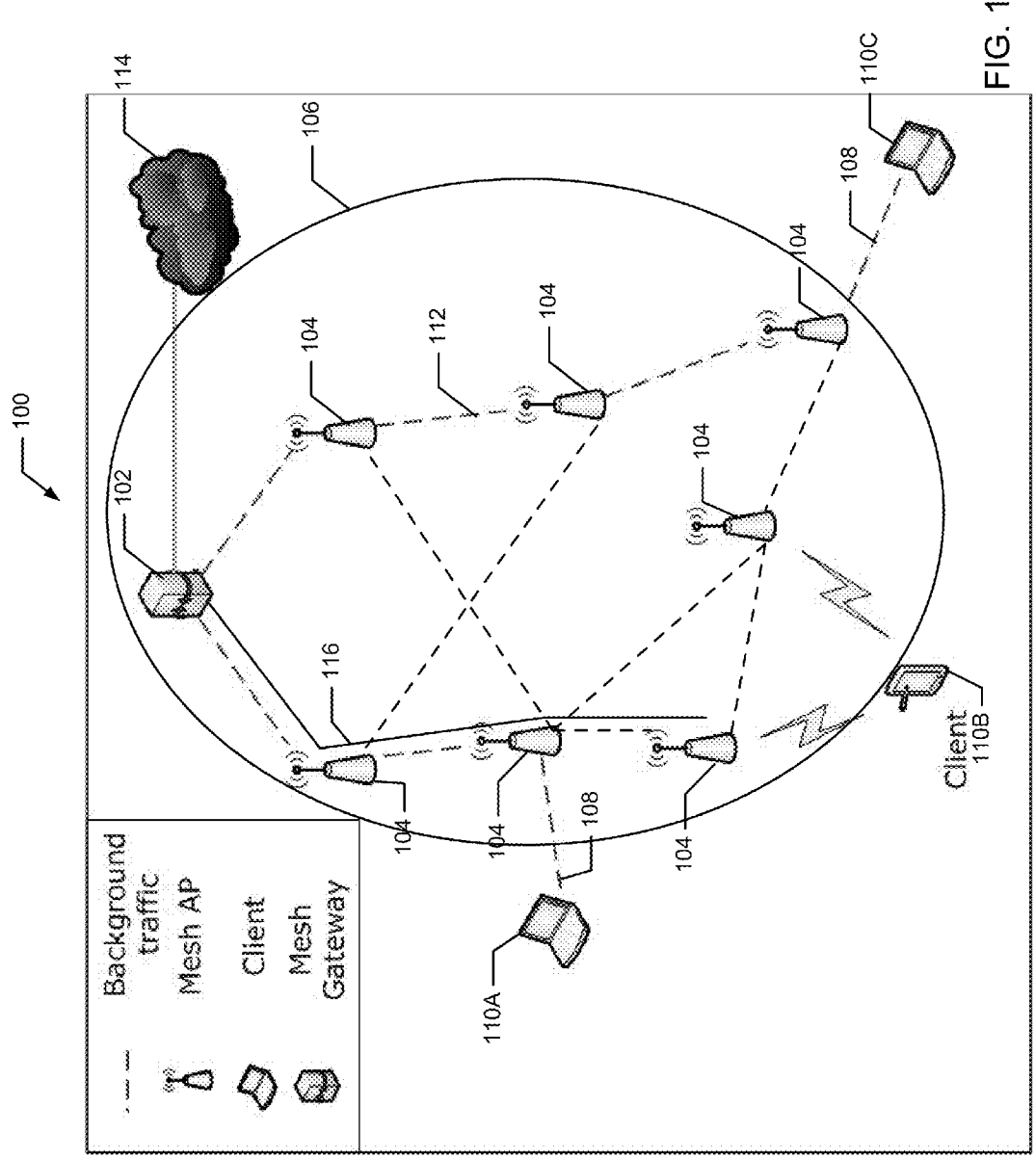
FIG. 1 depicts a wireless network environment is which various embodiments of the invention are practiced.

In some embodiments, the present invention provides an access point sensing (scanning) technique for mobile clients to maximize wireless access opportunities, while providing optimal energy conservation. Unlike existing systems, which rely on expensive localization mechanisms (e.g., GPS) or war-driving, the present invention provides a low-power sensor disposed in the mobile client to maximize the usage of wireless network. The present invention further provides an AP selection technique for selecting an access point for the mobile client so as to maximize the end-to-end performance, providing optimal user experience.

According to a further embodiment, the method includes detecting one or more access points within a region in which the mobile client resides, monitoring at least a link quality and a load characteristic of the wireless network, and selecting an access point from the detected one or more access points for connecting the mobile client to the wireless network in response to at least the link quality and the load characteristic of the wireless network so as to maximize an end-to-end performance of the wireless connection.

According to some alternative embodiments, a computer readable medium having computer readable codes stored thereon is provided. When executed by one or more digital processors, the computer readable codes instruct the one or more digital process to providing a mobile client with a wireless connection. The computer readable codes include instructions for periodically triggering an access point scanning process for monitoring an access point density of a wireless network, and instructions for adjusting a frequency of the triggering in response to a change in the access point density so as to maximize energy conservation and access opportunity at the mobile client.

According to a further embodiment, the computer codes further include instructions for detecting one or more access points within a region in which the mobile client resides, instructions for measuring at least a link quality and a load characteristic of the wireless network, and instructions for selecting one of the detected one or more access points to connect the mobile client to the wireless network in accordance with at least the link quality and the load characteristic of the wireless network so as to maximize an end-to-end performance of the wireless connection.

In still some alternative embodiments, a mobile client is provided for connecting to a wireless network through one or more access points. The mobile client includes a scanning module configured to periodically trigger an access point scanning process for monitoring an access point density of the wireless network, an adjustment module configured to adjust a frequency of the triggering in response to a change in the access point density so as to maximize energy conservation and access opportunity at the mobile client.

In a further embodiment, the mobile client includes an association module configured to monitor at least a link quality and a load characteristic of the wireless network and select an access point to connect the mobile client to the wireless network in accordance with at least the link quality and the load characteristic of the wireless network so as to maximize an end-to-end performance of a wireless connection.

According to still some alternative embodiments, a system is provided for connecting a mobile client to a wireless network through. The system includes a plurality of access points distributed within the wireless network, and a mobile client configured to periodically trigger an access point scanning process for monitoring an access point density within a region in which the mobile client resides. The mobile client is further configured to adjust a frequency of the triggering in response to a change in the access point density.

In a further embodiment, each of the plurality of access point is configured to measure at least a link quality and a load characteristic of the wireless network and configured to transmit the measurements indicative of the link quality and the load characteristic to the mobile client.

In still a further embodiment, the mobile client is configured to receive the measurements of the link quality and the load characteristic, and when the mobile client detects one or more access points of the wireless network, the mobile client is configured to select one of the detected one or more access points in accordance with the measurements of the link quality and the load characteristic of the wireless network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, a method, apparatus, and system for connecting a mobile client to a wireless network are provided. The wireless network here includes, but not limited to, Wi-Fi networks, Bluetooth networks, WiMAX networks, or any wireless networks that comply with industrial standard such as IEEE 802.11, which is hereby incorporated by reference in its entirety. Alternatively, the wireless network can be a proprietary network that provides data communications through a plurality of access points.

In general, the method described herein provides an access point sensing process (e.g., scanning and association) by considering mobile client's movement and activity and the density of the access points within the transmission range of the mobile client.

In particular, the mobile client periodically scans channels to discover available wireless access point. Because wireless access opportunities is affected by spatial changes such as mobile client's movements and access point density, scanning frequency of the access point sensing process is adapted based on the spatial changes to save energy as well as maximize the access opportunities. The mobile client is provided with access point density and fine-grained mobility information for sensing access points so as to maintain optimal energy conservation and wireless access opportunities.

Furthermore, the method provides energy efficient access point sensing by optimizing trade-off metrics, which can be defined as the ratio of the energy spent on discovery and communications over the wireless networks to the total delivered bits to mobile clients.

Still furthermore, due to the heterogeneous nature of wireless access opportunities, the method described herein utilizes information about access network condition, as well as AP density at a given location, which allows mobile clients to discover new access points. Wi-Fi networks. For instance, in highly dense area, where wireless access points are densely populated, with high average received signal strength (RSS), mobile clients can increase the migration threshold to find better APs, whereas in sparsely populated areas, they can lower the migration threshold to avoid migration overheads. Here, migration, also known as handoff, refers to the process of disconnecting a mobile client from an existing access point and connecting the mobile client with another access point, when certain conditions are met.

The mobile client includes, but not limited to, portable computers, cell phones, PDAs, and smart phones which have the capability to access wireless networks. The method includes periodically triggering an access point scanning process for monitoring an access point density of a wireless network, and adjusting a frequency of the triggering in response to a change in the access point density so as to maximize energy conservation and access opportunity at the mobile client.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 include wireless network 106 including a plurality of access points 104, and one or more mobile clients 110A-C. In some embodiment, wireless network 106 further includes an edge gateway 102 which connects wireless network 116 to an external network 114, such as an Internet, local/wide area network, a telephone network, or a cellular network.

In general, access points 104 are interconnected via wireless links 112, each of which can include one or more wireless channels centered at different transmission frequencies, such as 900 MHz or 2.5 GHz. Each link 112 can provide unidirectional or bidirectional data transmissions on the one or more wireless channels. Furthermore, when data is transmission from one access point to another, the data traverses a wireless path such as path 116 through wireless network 106 which is formed by one or more access points (nodes). As shown in FIG. 1, path 116, which is an exemplary embodiment of the wireless network path, may include one or more hops, each defined by a pair of adjacent nodes along the path. The data can be transmitted on the same wireless channel throughout the wireless path. Alternatively, the wireless channel used to transmit the data can be different from one hop to the next along the wireless path.

In additional to the functions similar to those provided by access points 104, edge gateway 102 also provides interfaces to external network 114. These interfaces provide addresses translations and data conversions and encapsulations, which are well known in the art.

When a mobile client such as 110A-C comes into the transmission range of an access point 104, the access point 104 can provides wireless connections 108 between the wireless client and wireless network 106. Upon initial connection, the access point may require authentications from the wireless client. Once, the mobile client is authenticated, it is allowed to move within the wireless network 106 without additional authentication.

Each of mobile clients 110A-C is configured to periodically scan a region within the transmission range of the wireless signal to determine if any access points are within the transmission range. The mobile client can select one of the detected access points to access the wireless network 106. When the mobile client moves, the network topology changes, or the environment changes, the mobile client can migrate from one access point to another.

Generally, mobile clients 110 may include virtually any mobile computing device capable of receiving data over a network, such as wireless network 110, or the like. Such devices include portable devices such as, cellular telephones, smart phones, radio frequency (RF) devices, infrared devices, Personal Digital Assistants (PDAs), handheld computers, laptop computers, wearable computers, tablet computers, integrated devices combining one or more of the preceding devices, or the like.

Illustrative Mobile Client Devices 110A, 110B, and 110C

Figure 2A:
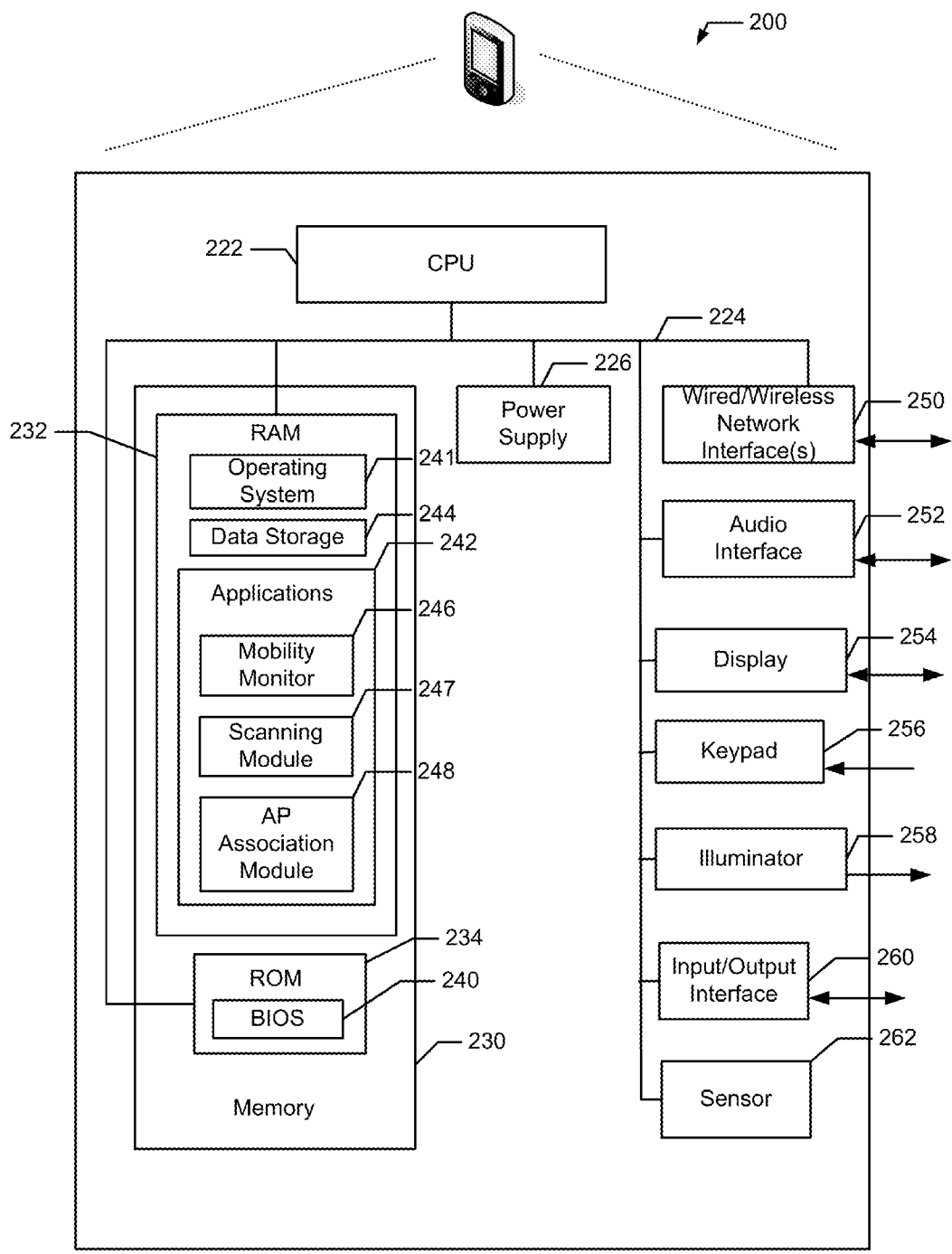
FIG. 2A depicts a schematic diagram of one embodiment of a mobile client shown in FIG. 1.

FIG. 2A shows one embodiment of mobile client device 200 that may be included in system 100 implementing the invention. Device 200 may include many more or less components than those shown in FIG. 2A. However, the components shown are sufficient to implement an illustrative embodiment for practicing the present invention. Device 200 may represent, for example, one embodiment of at least one of mobile clients 110A, 110B, and 110C of FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, and an input/output interface 260. Power supply 226 provides power to device 200. A rechargeable or non-rechargeable battery may be used to provide power. The power may also be provided by an external power source, such as an AC adapter or a powered docking cradle that supplements and/or recharges a battery.

Device 200 can communicate with another computing device directly or indirectly via wired/wireless network interface 250. Network interface 250 includes circuitry for coupling device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.11 Wi-Fi, IEEE 802.16 Worldwide Interoperability for Microwave Access (WiMAX), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the device is powered. In addition, illuminator 258 may backlight these buttons in various patterns when particular actions are performed, such as dialing another device. Illuminator 258 may also cause light sources positioned within a transparent or translucent case of the device to illuminate in response to actions.

Device 200 also comprises input/output interface 260 for communicating with external devices, such as a headset. Input/output interface 260 can utilize one or more communication technologies, such as USB, infrared, Bluetooth™, or the like.

Device 200 typically ranges widely in terms of capabilities and features. For example, a cell phone may have a numeric keypad and a few lines of monochrome LCD display on which only text may be displayed. In another example, a web-enabled mobile device such as a PDA may have a touch sensitive screen, a stylus, and several lines of color LCD display in which both text and graphics may be displayed. In still another example, a multimedia-enabled mobile device such as laptop 110A may include a multimedia application such as a video player application, which is configured to render images, videos streams, audio signals, or the like through a multimedia interface such as a color LCD or LED screen or a microphone. In still another example, device 200 may also include a browser application configured to receive and display graphics, text, multimedia, or the like, employing virtually any web-based language, including a wireless application protocol messages (WAP), or the like. For example, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

As depicted in FIG. 2, device 200 also include a sensor 262 for monitoring movements of the mobile client caused by the motions of the user, such as walking, running, or biking. In general, sensor 262 can general signals which reflects the movements of the mobile client. Sensor 262 can convert the signals into digital data, which is then stored in the data storage portion 244 of the memory or provided to the CPU 222 for practicing the invention. Sensor 262 can take many forms of accelerometers and is usually embedded in the mobile client.

Device 200 further includes a mobility monitor 246 which is configured to detect the movements of the mobile client from the data generated by sensor 262. For example, the mobility monitor 246 can classify the data into multiple categories including walking, running, and biking and calculate a traveled distance of the mobile device based on the classified motion data.

Device 200 further includes a scanning module 247, which can periodically trigger an access point scanning process to detect if and how many access points are currently within the transmission range.

Device 200 further includes an access point association module 248 which can select an access point to connect the mobile client to the wireless network 106. The access point association module 248 can select the access point based on various criteria such as link qualities and load characteristics of the wireless network 106. The association module 248 can also provide mobile client migration from one access point to another based on similar criteria.

In FIG. 2A, the mobility monitor 246, scanning module 247 and access point association module 248 are implemented as one or more computer programs including computer readable codes stored in the application section 242 of the memory. These computer programs can be implemented by programming languages such as C, C++, Java, etc.

Figure 2B:
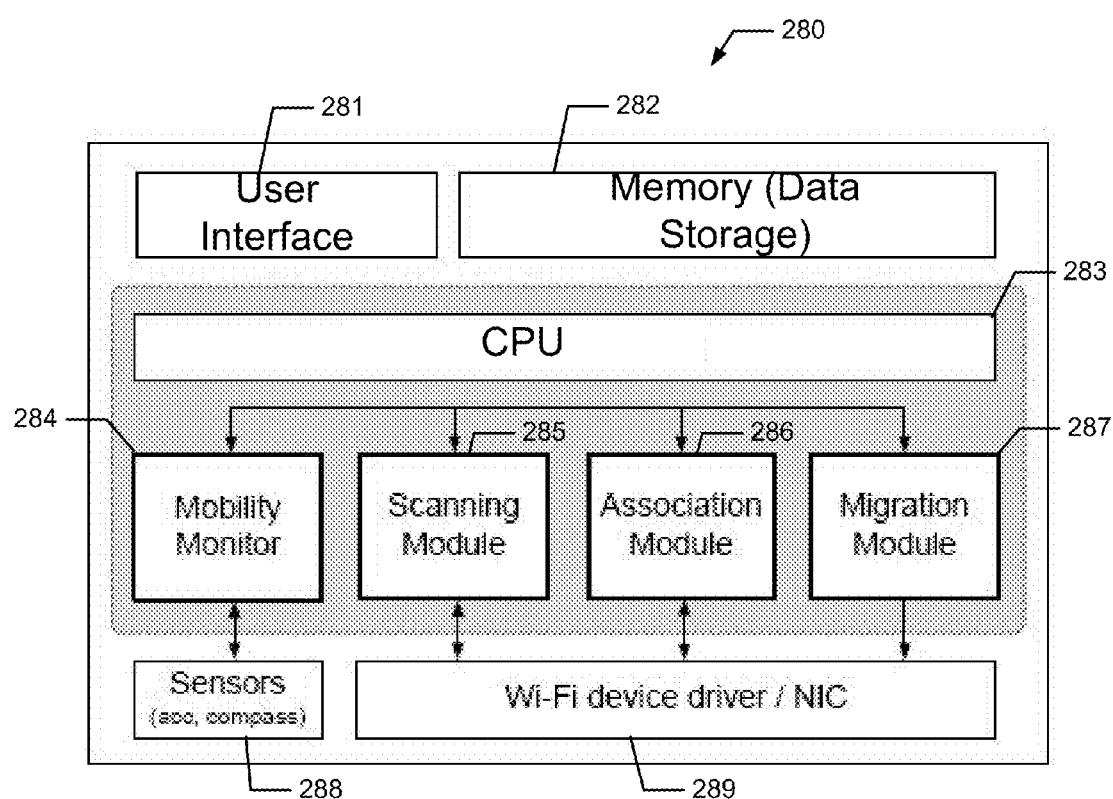
FIG. 2B depicts a schematic diagram of another embodiment of the mobile client shown in FIG. 1.

Alternatively, the various modules described above can also be implemented as hardware modules as depicted in FIG. 2B. In this embodiment, device 280, which can also be used for mobile clients 110, includes user interface 281, memory 282, CPU 283, sensor 288, network interface 289, and additional mobility monitor 284, scanning module 285, association module 286, and migration module 287. According to this embodiment, these modules are hardware components including one or more circuits, which can be proprietary circuits or general programmable logic devices.

Illustrative Network Nodes 104

Figure 3:
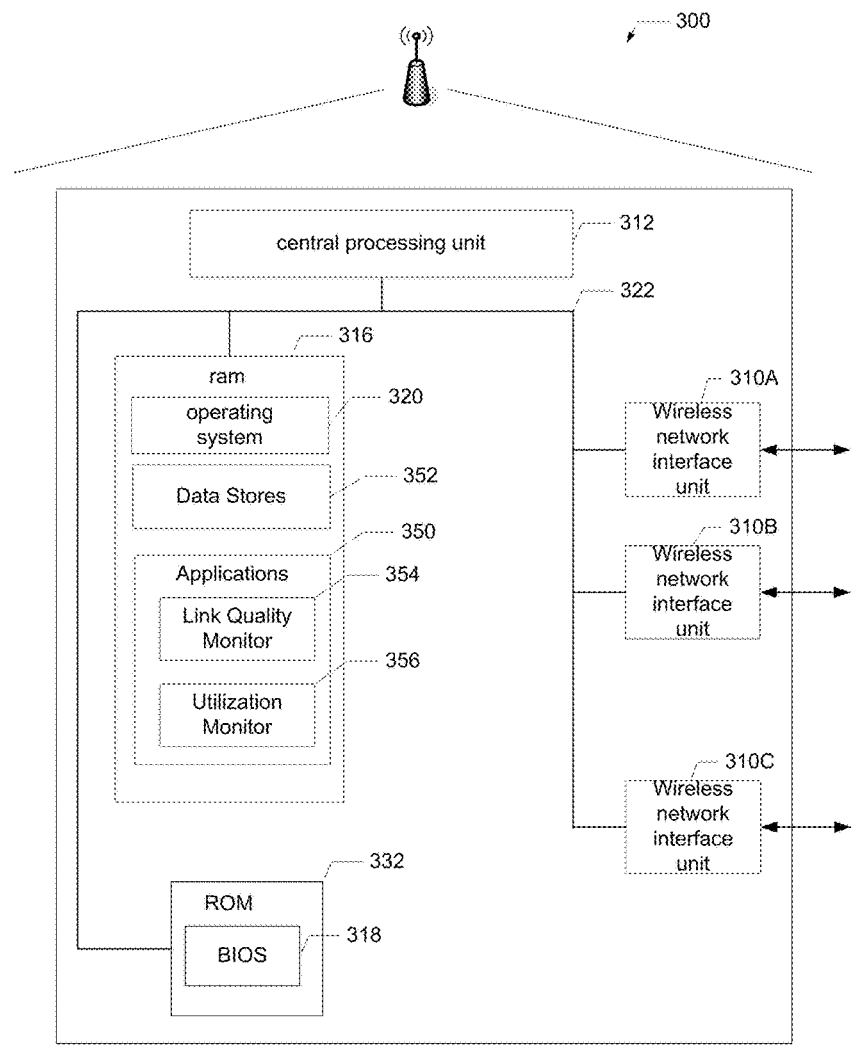
FIG. 3 depicts a schematic diagram of one embodiment of a wireless access point shown in FIG. 1.

FIG. 3 shows one embodiment of access point 300, which can be used in wireless network 106 of FIG. 1. Access point 300 may include many more or less components than those shown. The components shown, however, are sufficient to disclose an illustrative embodiment for practicing the invention.

Specifically, network device 300 includes processing unit 312, a mass memory, and one or more network interface units 310A, 310B, and 310C (collectively referred to as "wireless interface units 310"), all in communication with one another via bus 322. The mass memory generally includes RAM 316, ROM 332, and one or more permanent mass storage devices, such as hard disk drive, tape drive, optical drive, and/or floppy disk drive. The mass memory stores operating system 320 for controlling the operation of access point 300. Any general-purpose operating system may be employed. Basic input/output system ("BIOS") 318 is also provided for controlling the low-level operation of network device 300.

As illustrated in FIG. 3, network device 300 also can communicate with other access points 104 or the mobile clients 110 via wireless network interface units 310A, 310B, and 310C, which is constructed for use with various communication protocols including the TCP/IP, Wi-Fi, Bluetooth, etc. Wireless network interface units 310A, 310B, and 310C are sometimes known as wireless transceivers, transceiving devices, or network interface cards (NIC). Each of wireless units 310A, 310B, and 310C can operates at the same or different frequency range, such as 900 MHz, 2.5 MHz, or 5 MHz. When a wireless interface unit 310 is in communication with another access point 104, it acts as a network router for routing data through wireless network 106. On the other hand, when a wireless interface unit 310 is in communication with a mobile client 110, it acts as an access point for the connected mobile client to access wireless network 106. Therefore, through wireless interface units 310A, 310B, and 310C, device 300 can acts as a wireless router and an access point at the same time.

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores, which can be utilized by access point 300 to store, among other things, applications 350 and/or other data. RAM 316 can also be used to store database information. The mass memory also stores program codes and data. One or more applications 350 are loaded into mass memory and run on operating system 320 by central processing unit 312. Examples of application programs include link quality monitor 354 and utilization monitor 356, customizable user interface programs, IPSec applications, encryption programs, security programs, and so forth.

The operations of link quality monitor 254 and utilization monitor 356 will be further described hereinafter.
Generalized Operation of System 100

Due to the unplanned deployment of access points (APs), and their small coverage areas, mobile users are frequently disconnect from APs, and thus need to actively discover wireless access opportunities. Even if many open wireless APs 104 exist in a given area, there may be black spots in coverage, or the throughput may not be good at some locations for a satisfactory user experience. To discover wireless access opportunities, mobile clients 110A, 110B, and 110C (collectively referred to as "mobile clients 110") periodically trigger an access point scanning process.

Figure 6:
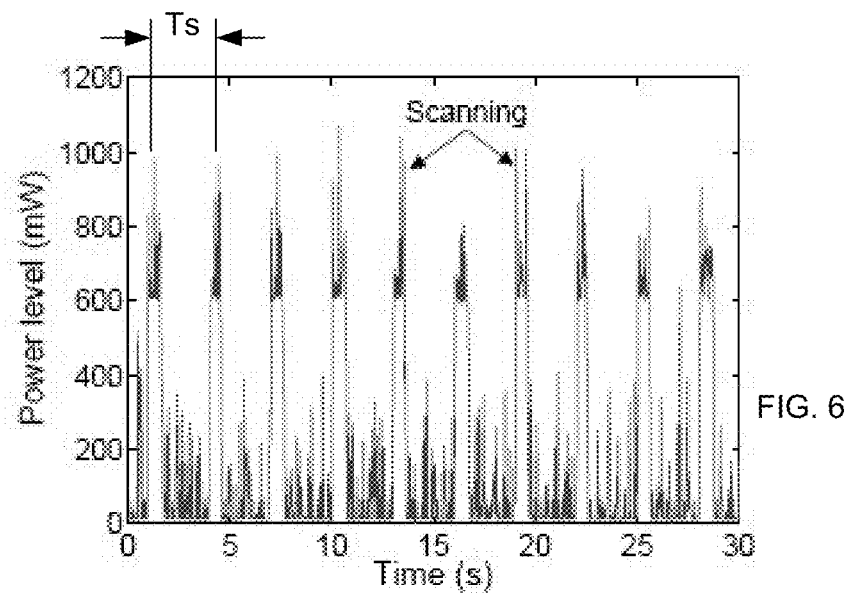
FIG. 6 depicts the power consumption of periodic access point scanning with an adjustable triggering interval Ts.

However, access point scanning consumes significant amount of energy in mobile clients 110. FIG. 6 shows the power consumption of a Wi-Fi scanning process in a GOOGLE G1 phone. Data shown in FIG. 6 is measured in an experiment using Agilent 34410A Digital Multimeter with 20 samples per second. During the experiment, all other applications and background services are turned off, and therefore the energy consumption of the AP scanning process are reflected in the data. As shown in the figure, AP scanning is energy expensive, at about 1.1 J (i.e., 00 mW×1.3 second) per scanning, mainly because it needs to scan a complete set of ISM channels and receive multiple beacons from all neighboring APs. Due to its high energy consumption, the scanning process is triggered periodically, resulting in the spikes of energy consumption. The time interval Ts between every two pikes are determined by the frequency of the triggering.

According to one embodiment of the invention, in order to maximize energy conservation (i.e., reduce energy consumption), while maintaining wireless access opportunity (i.e., reduce scanning errors), a method is provided to adjust the frequency (i.e., time interval Ts) of the triggering based on various conditions such as density of the access points or movements of the mobile client.

In another embodiment, when a mobile client 110A-C is exposed to multiple access points 104, the invention further provides a method for estimating the network conditions to choose the best AP. This also leads energy-efficient data transmissions. In particular, to provide estimation and association selection, system 100 allows mobile clients 110A-C collect information on the wireless last-hop (i.e., client-to-AP), and the mesh backhaul (AP-to-gateway) conditions. Existing techniques with active probing scheme are power-intensive due to large amounts of data packets transmitted to and from the APs. Unlike existing techniques, mobile clients 110A-C are in system 100 are allowed to monitor the network conditions using data collected from the APs 104 without active providing.

While being connected, mobile hosts can experience link condition fluctuation, especially for wireless last-hop, and they can suffer from false triggering of AP sensing (e.g., mobile host sitting in the boundary of multiple APs). Even in the absence of user mobility, wireless last-hop condition fluctuates with users' movement or new obstacles. This tends to cause AP sensing to be triggered more often than it should be, resulting in frequent network probing and re-association. Reactive triggering of AP sensing can save the associated overheads, but delayed sensing can increase missed opportunities.

According to another embodiment, system 100 provides a mechanism to trigger the AP scanning based on a triggering probability ($P_{scan}$) as well as the received signal strength (RSS) threshold at the mobile client. The triggering probability is updated in response to the movements of the mobile client. The RSS threshold is updated in response to the density of the APs. Triggering based on the triggering probability reduces false-triggering due to fading-induced RSS fluctuation.

In the areas with densely-deployed wireless AP and high average RSS, mobile clients 110 proactively sense for new and/or better wireless access opportunities and perform migration to improve energy efficiency and end-to-end performance in data transmissions.

Unlike existing systems which trigger sensing and migration only when the received signal strength (RSS) goes below a certain predefined threshold, mobile clients 110A-C triggers sensing and migration in response to movements of the mobile clients and network conditions such as the AP density. In one embodiment of the invention, the threshold for triggering the migration is adapted in response to at least one of the movements and AP density. The threshold can be adapted continuously or at discrete values.

Figure 7:
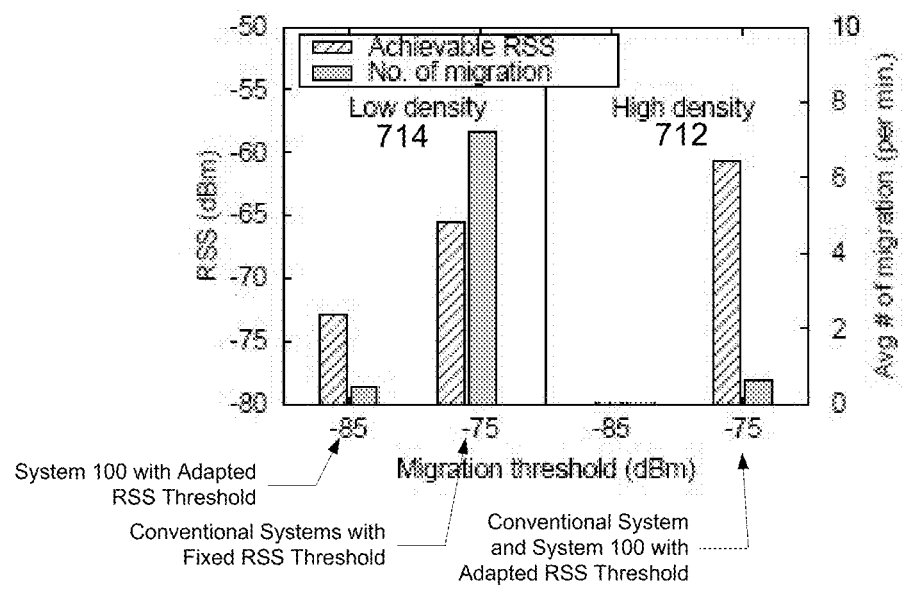
FIG. 7 depicts performance comparison of between fixed-threshold access point scanning and adaptable-threshold AP scanning.

FIG. 7 illustrates a comparison between the migration performances of an embodiment of system 100 and that of an existing system which use fixed RSS threshold. The embodiment shown here utilizes two discrete values (−75 dBm and −85 dBm) for adapting the RSS threshold, whereas the fixed threshold system utilizes −75 dBm as the RSS threshold value. In the exemplary embodiment, the RSS threshold is changed for different AP densities (high and low densities). The mobile client triggers migration only when the RSS from the current AP goes below the RSS threshold. FIG. 7 shows average RSS from associated APs while the mobile client moves around in an indoor test-bed, which has high AP density area 712 and low AP density area 714. As shown in the figure, in high AP density area 712, both conventional system and the exemplary embodiment of system 100 result in higher achievable user RSS with less migration overheads. On the other hand, in low AP density area 714, the conventional system that uses high threshold (−75 dBm) leads to significant energy cost and disruption due to the increased number of migrations, whereas the exemplary embodiment of the system 100 with adapted RSS threshold can achieve relatively high RSS with significantly less energy cost caused by the reduced number of migrations.

According to the embodiment as depicted in FIGS. 2A and 2B, various modules are provided for the mobile client 200 to scan, probe, associate, and migrate over multiple wireless access points 104 of wireless network 106 so as to maximize wireless access opportunities, while saving energy cost per bit.

Specifically, mobile client 200 makes use of fine-grained movement information extracted from low-power sensors, such as an accelerometer, disposed thereon, in order to discover wireless access opportunities. Such mobile-centric mobility detection helps avoid triggering expensive location tracking or war driving. Mobile client 200 provides a disconnected sensing process that adjusts the AP scanning frequency to maximize the discovery of network opportunities with reduced energy cost, when the mobile client 200 is disconnected from any AP. Mobile client 200 further provides a connected sensing process that proactively identifies and migrates the mobile client from one access point to another to maximize wireless access opportunities. Still further, mobile client 200 employs both network condition information and movement information to reduce false association/migration triggering.

Mobile client 200 can be implemented on many different platforms such as the Android framework using GOOGLE's G1 Android Development Phones (ADP), or APPLE's iPhone, or MICROSOFT's Windows Phone, etc. According to a further embodiment, the modules depicted in FIGS. 2A-B can be implemented as a middleware program that exploits information from low-power sensors disposed in the mobile client 200, and interacts with other components.

The program, when executed by the mobile client 200, provides improvements in energy-efficiency for always-on wireless connectivity in three main aspects. First, the sensor-assisted adaptive AP scanning reduces the number of scans, while significantly reducing missed access opportunities. Second, network-aware association control saves probing overhead, and further improves the accuracy of AP selections. Third, the mobility-based adaptive migration helps mobile clients 110 opportunistically determine optimal migration times.

Under the instructions of this program, mobile client 200 provides energy-efficient AP discovery through the following features.

Movement-aware access point sensing: mobile client 200 collects information on its own physical movements and combines this information with network conditions to optimize AP sensing frequency or timing and to trigger or suppress AP sensing operations.

Use of a low-power sensor: Unlike existing movement detection methods based on GPS or cell-tower ID, which are usually power-intensive or suffer from inaccuracy, mobile client 200 uses low-power sensor disposed onboard such as an accelerometer to infer the movements and determine triggering points.

Sensing while Connected or Disconnected: mobile client 200 not only identifies wireless access opportunities when it is disconnected from the network, but also proactively seeks better access opportunities when it being connected to an existing access point.

Dynamic AP sensing: mobile client 200 monitors of the heterogeneity of the wireless access opportunities over space, and dynamically changes its sensing parameters to increase the discovery of network opportunities as well as to improve energy efficiency.

Energy-Efficient Access Point Sensing

Figure 8A:
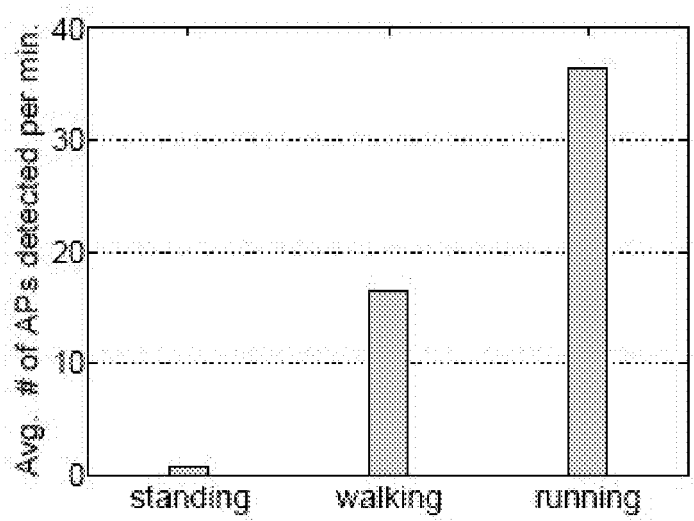
FIG. 8A depicts the average number of new access points detected by the access point scanning process when the mobile client is moved.

As noted above, physical location and movements of the mobile clients 110 relative to wireless network 106 affects the discovery of connection opportunities. FIG. 8A shows the average number of new APs detected via AP scanning while the user carrying the mobile client is standing, walking, and running, along the road side of a downtown area for five minutes. As shown in the figure, increasing mobility translates to higher number of discovered wireless access opportunities (i.e., number of AP detected within an area during a time frame). In one embodiment, mobile client 200 adaptively changes its sensing frequency depending on its movements. For instance, when sensor 262 or 288 onboard the mobile client 110 detects that its user does not move, the AP scanning is triggered less frequently or even suppressed when the mobile client is not connected to any wireless network. When sensor 262 or 288 detects that the user walks through an area with a dense AP population, the AP sensing process is triggered more often.

In a further embodiment, the user mobility is monitored by the on-board sensor in an energy efficient manner. Furthermore, the movement information detected by the on-board sensor becomes available in real time to be used for detecting access opportunities. In particular, sensor 262 or 288 includes a low-power accelerometer sensor to detect user's movement. This low-power accelerometer is similar to those available in existing systems such as APPLE's iPhone and GOOGLE's G1 Phone. Compared with GPS sensors, whose energy consumption is high, the low-power accelerometer requires much less energy for proper operation. In addition, in monitoring the movements of the clients 110, sensor 262 or 288 does not require external information, such as cellular radio or Bluetooth signals, thereby offering several benefits including controllability, accuracy, and less power-consumption.

In operation, mobility monitor 246 or 284 periodically monitors accelerometer values and classifies user's activity into categories such as walking, running, or standing, at a given time instance. This activity-based mobility estimation allow a mobile client to infer meaningful activities of the user, including standing, walking, running, biking, and driving, based on sensor readings.

Figure 8B:
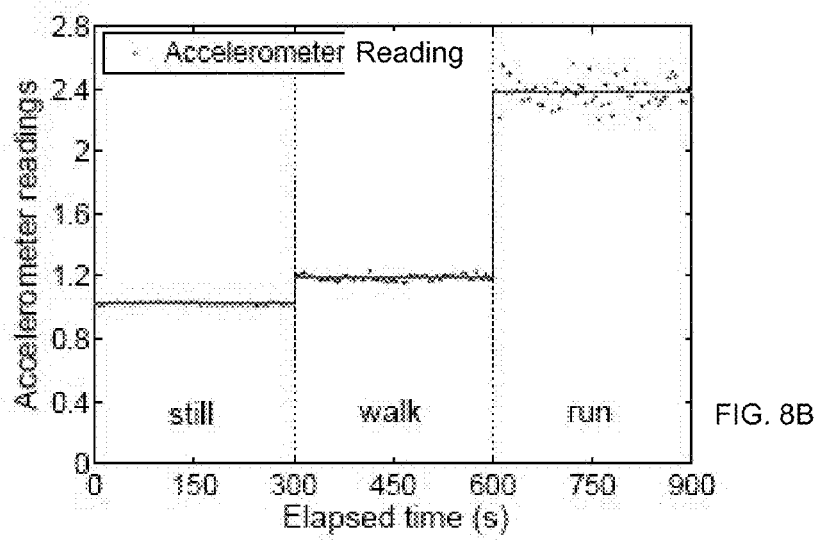
FIG. 8B depicts data samples collected from the built-in accelerometer on one embodiment of the mobile client with 20% duty cycle under different movement activities.

FIG. 8B illustrates an exemplary embodiment of the accelerometer-based activity classification collected from a GOGGLE G1 Phone. As the mobile client is put in the pocket and different activities (e.g., standing, walking and running) are performed, a movement metric (x, y, z) is calculated by mobility monitor 246 or 284, where x, y, and z represent the accelerometer value along the three axes based on accelerometer samples. In particular, the accelerometer is periodically turned on (e.g., on for 1 second and off for 4 seconds) and the average of the samples obtained during the time interval is calculated. As shown in the figure, the movement estimation generated by the mobility monitor 246 or 284 accurately detects user's activities. In a further embodiment, the user activity classification is provided based on Goertzel's method described in non-patent literature, G. Goertzel. "An algorithm for the evaluation of finite trigonometric series," The American Mathematical Monthly, vol. 65, pp. 34-35, 1958, which is hereby incorporated by reference in its entirety.

Figure 4A:
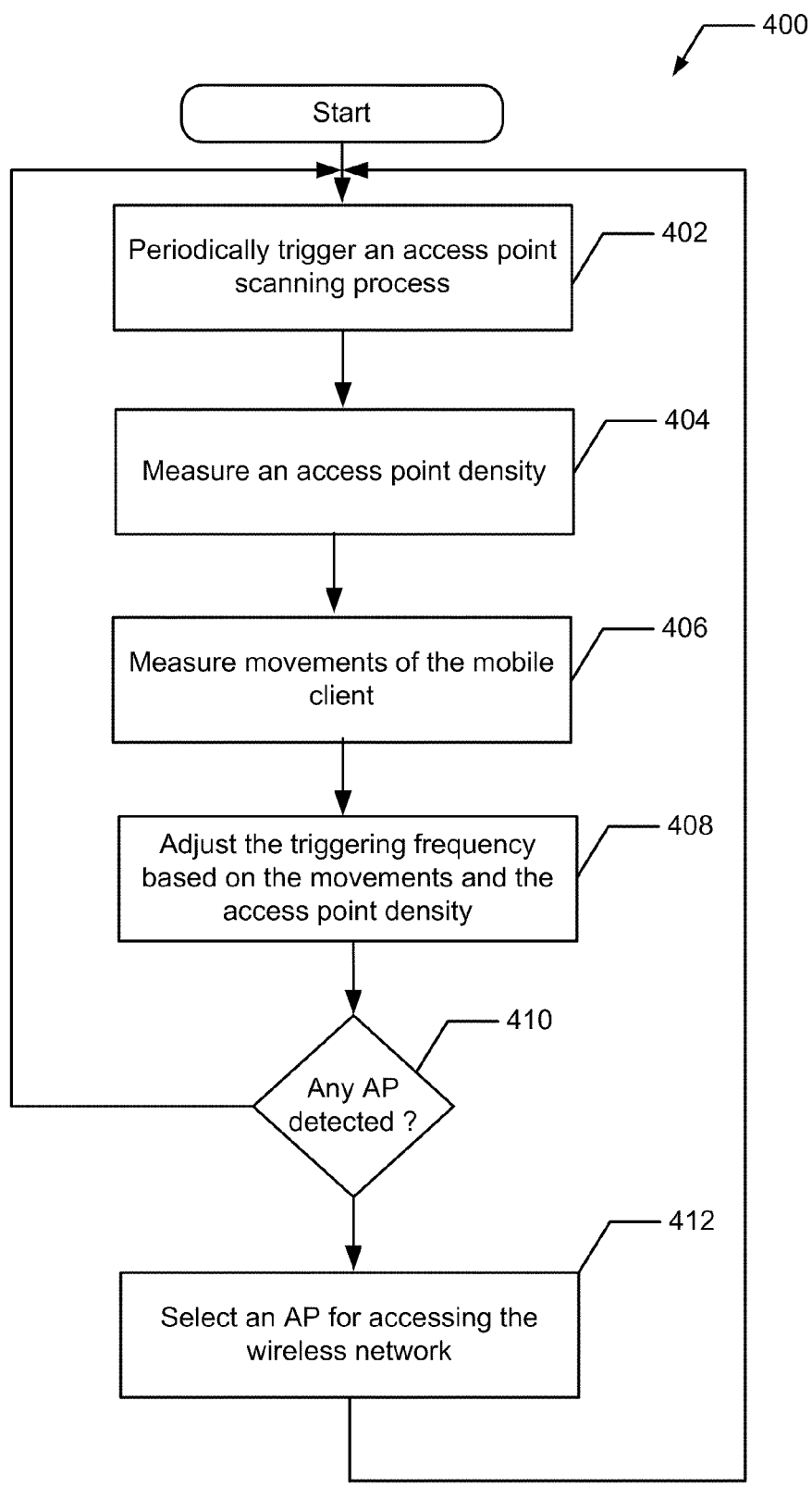
FIG. 4A depicts a flow chart of a method for triggering the access point sensing process at a mobile client.

According to another embodiment as depicted in FIG. 4A, a method 400 is provided for connecting a mobile client to a wireless network. In this embodiment, the mobile client periodically triggers an access point sending process for monitoring an access point density of the wireless network (402 and 404). During each sensing interval, the mobile client further measures its movements (406). The frequency (sensing interval) is then dynamically adjusted based on the movements of the mobile client and the AP density so as to maximize the energy conservation and wireless access opportunity (408). When each sending process is complete, the mobile client determines if there is any AP available (410). If no AP available, the mobile client continues to the next triggering cycle. If, on the other hand, at least one AP is available, the mobile client selects an AP to access the wireless network (412) and then continues to the next triggering cycle. Alternatively, at step 412, if the mobile client is currently connected to an AP, the mobile client then determines if a migration is necessary to maximize the end-to-end performance. If the migration criteria are met, the mobile client then migrates from the existing AP to the selected AP.

According to another embodiment, mobile client 110 operates in a disconnected and connected modes. Based on the operation modes, mobile client 110 triggers a different AP sensing process as shown in FIGS. 4B and 4C.

Access Point Sensing in Disconnected Mode

When disconnected from wireless network 106, scanning module 247 or 285 periodically triggers mobile client 110 to perform the AP scanning process to discover any access options. The AP scanning process advantageously makes use of the statistical observation from the wireless networks. Based on scanning results obtain in the past time windows, mobile client 110 can estimate the local AP density and adapt the scanning interval Ts (or triggering frequency) so as to minimize the delay in detecting available wireless access points, while reducing the number of scans, thereby maximizing energy conservation.

In designing a scanning technique to provide the advantages discussed above, two assumptions are made for the behavior of the wireless network condition. First, the AP distribution follows a point Poisson process with the average density $\rho$, i.e., number of APs per square meter, as described in non-patent literature, D. Qiu et al., "Physical Pseudo Random Function in Radio Frequency Sources for Security," Technical report, Stanford University, February 2009, which is hereby incorporated by reference in its entirety.

Second, as described in non-patent literature, W. Wang et al. "Joint Effects of Radio Channels and Node Mobility on Link Dynamics in Wireless Networks," In *Proc. of IEEE Infocom*, April 2008, which is hereby incorporated by reference in its entirety, it is assumed that the client-AP connectivity lifetime, i.e., the time span during which the physical distance between the client and AP is smaller than the effective transmission range, can be approximated as an exponential distribution, i.e., $$T_l \sim \exp\left(\frac{\bar{v}}{R}\right),$$

where $\bar{v}$ is the average speed of the mobile client, and R is the common transmission range of the APs, which is assumed to be a unit-disk model as well known in the art.

Given these assumptions, the average arrival rate of new APs is derived. Consider a mobile client moving at an average speed $\bar{v}$. Then, the expected area covered by the mobile host during the time period $(t_1, t_2)$ is approximately $2R\bar{v}(t_2-t_1)$. Then, according to the assumption of Poisson distributed APs, the average arrival rate of new APs is $\lambda \approx 2R\bar{v}\rho$, where $\rho$ is the average AP density.

Figure 8C:
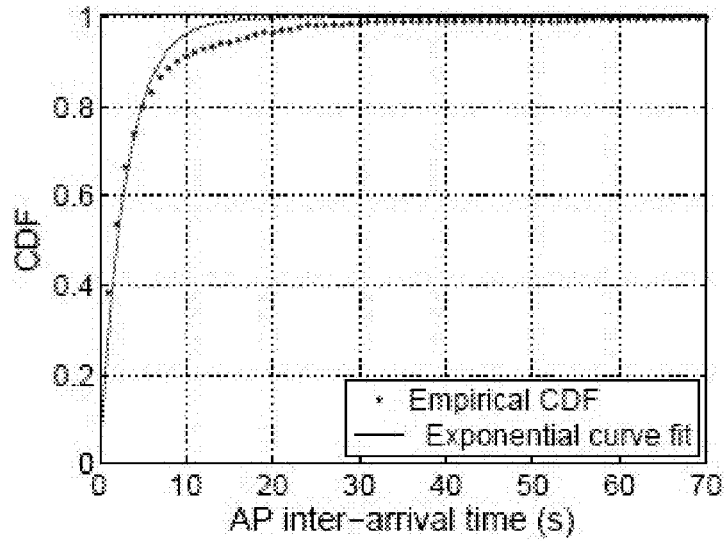
FIG. 8C depicts measurement results showing that the AP inter-arrival time is accurately approximated as an exponential distribution according to the invention.

FIG. 8C shows the cumulative distribution function (CDF) of the AP inter-arrival time. The figure clearly indicates that this function can be approximated as an exponential distribution, thus corroborating the above-discussed assumption. The gap between the empirical and approximated curves can be explained as follows. In practice, APs can be highly clustered and may not exactly follow the Poisson distribution. The irregularity of the measurement of mobile client's movements can also create such a gap. Based on the assumptions, the availability of access points can be modeled as a Markov model with two states, i.e., disconnected (D) and connected (C) states. The disconnected state means that there is no available AP for the mobile client 110 to connect to, otherwise it is connected. Note that according to the assumptions, the AP arrival and departure rates are given as $\lambda=2R\bar{v}\rho$ and $$\mu = \frac{\bar{v}}{R},$$

respectively. Thus, the state transition probabilities for the two-state model can be easily derived as $\lambda_d=\lambda$ and $$\lambda_c = \frac{(\mu-\lambda)\lambda}{\mu}$$

where $\lambda_d$ and $\lambda_c$ are the state transition probabilities for D→C and C→D, respectively.

Optimal Scanning Interval (Frequency)

Based on the above connectivity model, an optimal scanning interval (Ts) can be determined that minimizes missed wireless access opportunities, while maximizing the scanning interval for optimal energy conservation. A missed access opportunity is defined as the average fraction of times that an access opportunity has not been detected by mobile client 110.

In particular, for missed wireless access opportunity, consider a mobile client 110 that is disconnected from the wireless network 106 and periodically scans the spectrum at an interval $T_s$. Let $T_{m,d}(T_s)$ denote the missed opportunity (until an available AP is found) using the scan interval $T_s$. Then, it can be shown that:

$$T_{m,d}(T_s) = \frac{\lambda_d}{\lambda_d + \lambda_c}(1 - e^{-(\lambda_d + \lambda_c)T_s}), \quad (1)$$

where $\lambda_d = 2R\bar{v}\rho$ and $\lambda_c = 2R\bar{v}\rho(1-2R^2\rho)$

To see this, let $T_{m,d}(t)$ denote the average missed AP connectivity opportunity (in term of time) during time period ($\tau$, $\tau+t$). When there are no available APs at time $\tau$, the opportunity for connectivity (i.e., AP association) happens only when an available AP arrives during the time period t. Thus, the expected amount of missed opportunity for the time duration ($\tau$, $\tau+t$) can be expressed as:

$$T_{m,\bar{c}}(t) = t\int_t^\infty f_c(x)dx + \int_0^t f_c(x)(x + T_{m,\bar{d}}(t-x))dx.$$

Similarly, $$T_{m,\bar{d}}(t) = \int_0^t f_d(x)T_{m,\bar{c}}(t-x)dx.$$

The expected amount of missed opportunity, $T_{m,d}$ can be solved for in the frequency domain by taking the Laplace transform, i.e., $$T_{m,d}(s) = \frac{\mathbb{F}_d^*(s)T_{m,c}^*(s)}{E[T_c]},$$

$$T_{m,\bar{c}}(s) = \frac{f_c^*(0) - f_c^*(s)}{s^2} + f_c^*(s)T_{m,\bar{d}}^*(s),$$

$$T_{m,\bar{d}} = f_{m,d}^*(s)T_{m,\bar{d}}^*(s).$$

Based on these Laplace transforms, the expected missed opportunity $T_{m,d}(s)$ is given as:

$$T_{m,d}(s) = \frac{\mathbb{F}_d(s)}{E[T_d]s^2} \cdot \frac{f_c^*(0) - f_c^*(s)}{1 - f_c^*(s)f_d^*(s)}. \quad (2)$$

For exponentially-distributed connected and disconnected periods are given as, $$f_d(t) = \lambda e^{-\lambda t} \text{ and } f_c(t) = \mu e^{-\mu t}.$$

The Laplace transforms are then given as, $$f_d^*(s) = \frac{\lambda}{\lambda+s} \text{ and } f_c^*(s) = \frac{\mu}{\mu+s}.$$

Substituting these into formula (2) and taking the inverse Laplace transform yield formula (1).

Formula (1) indicates that the missed opportunity increases with increasing scanning interval $T_s$. From formula, the missed access opportunity shows the behavior of $$T_{m,d}(T_s) \to \frac{E[T_c]^-}{E[T_c] + E[T_d]} \text{ as } t \to \infty.$$

This confirms shows that as scanning interval increases, the mobile client miss-detects all the access opportunities.

Note that in the analysis, the scanning process is assumed to be an impulse, and thus missed access opportunity due to scanning is negligible.

Based on this analysis, an optimal scanning interval (Ts) can be determined to minimize the ratio of the energy spent on AP scanning to the total transmitted bits within a scanning interval $T_s$. Here, it is assumed that the energy consumption for data transmission is negligible. When a mobile client 110 scans for APs with fixed interval $T_s$, the fraction of the time that it detects an access opportunity is $1-T_d-T_{m,d}(T_s)$, where $$T_d = \frac{\lambda_c}{\lambda_d + \lambda_c}$$

is the average fraction of time in disconnected state. Then, the optimal scanning interval is given as:

$$T_s^* = \arg\min_{0<T_s\leq T_{max}} \frac{\varepsilon_{scan}}{T_s(1 - T_d - T_{m,d}(T_s))E[\mathcal{R}]}, \quad (3)$$

where $T_{max}$ is the maximum scanning interval, which is a predetermined parameter. For example, $T_{max}$ can be set to a small value for a mobile client running delay-sensitive applications (e.g., VoIP) and vice versa. In formula (3), the expected achievable data rate is denoted as E[R] and it depends on the AP with which the client associates. The AP association scheme is further detailed later in this application.

In the following, it is further shown that the optimal scanning interval that minimizes formula (3) is:

$$T_s^*(\bar{v}, \rho) = \left[\frac{1}{4R\bar{v}\rho(1-R^2\rho)}\right]^+, \quad (4)$$

where $\bar{v}$ is the average speed, $\rho$ is the average AP density, and R is the AP's transmission range (e.g., 200 m).

To show this, it is denoted that $$G(T_s) = \frac{E_{scan}}{T_s(1 - T_d - T_{m,d}(T_s))E[R]}$$

be the objective function in formula (***), i.e., energy spent on scanning per transmitted data bit. Assuming that the energy consumption for scanning, $E_{scan}$, and average achievable data rate, E[R], are given as constant, the process of finding an optimal scanning interval $T_s^*$ in formula (3) is equivalent to finding $T_s$ that maximizes $G(T_s)$, which can be found as:

$$\frac{\partial G(T_s)}{\partial T_s} = \frac{E_{scan}}{T_s(1 - T_d - T_{m,d}(T_s))E[R]} = 0$$

$$\Rightarrow \lambda_d\left(\frac{1}{\lambda_d + \lambda_c} - T_s\right)e^{-(\lambda_d+\lambda_c)T_s} = 0.$$

Obviously $g(T_a)$ is a monotonically increasing function of Ts in $$\left(0, \frac{1}{\lambda_d + \lambda_c}\right).$$

Therefore the optimal value of Ts is given as:

$$T_s^* = \frac{1}{\lambda_d + \lambda_c}.$$

Thus, formula (4) follows.

Figure 9A:
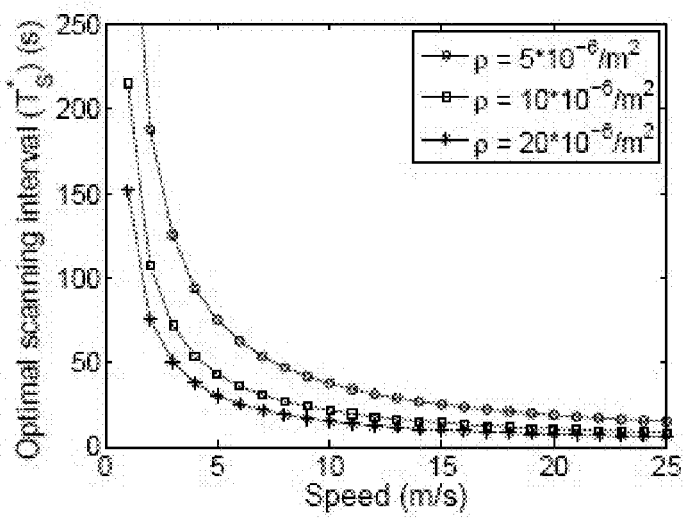
FIG. 9A depicts the optimal scanning interval (Ts) adapted to the mobile client's motion speed as well as the AP density, according to the invention.

Formula (4) implies that the optimal scanning period depends on the average moving speed ($\bar{v}$) of a mobile client and average AP density ($\rho$). For example, when a user moves fast, the AP arrival rate ($\lambda_d$) will increase, and the user is encouraged to scan more frequently, expecting to detect an available AP soon, and vice versa. FIG. 9A shows the optimal scan interval ($T_s^*$) for different users speed assuming that the transmission range of APs is R=200 m.

Access Point Sensing

According to one embodiment, a movement-based AP scanning method is provided based on the analysis conducted above. In this embodiment, the AP scanning is triggered based on the distance a mobile client 110 has traveled since the last scanning. The distance can be estimated using the movement sensing technique described above instead of relying on power expensive location tracking system such as GPS. Specifically, the traveled distance can be estimated as:

$$\hat{d} \approx \sum_{k \in \kappa} n_k \times v_k,$$

where K is the set of user activities that can be classified based on the accelerometer readings as described above, and $v_k$ is the average speed corresponding to the activity k∈K. After every AP scan, the travel distance is reset to zero so that the inaccuracy in the system does not accumulate.

Figure 9B:
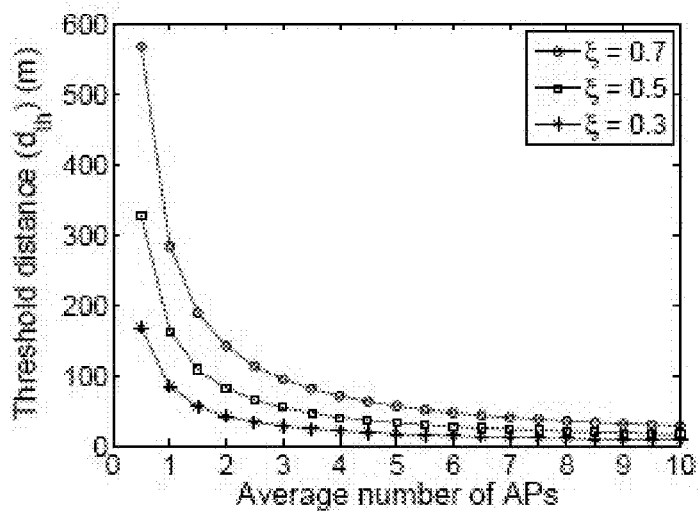
FIG. 9B depicts the threshold distance for AP scanning as a function of the average AP density for various probability value $\xi$ according to the invention.

According to a further embodiment, a mobile client 110 triggers the AP scanning process when it travels more than a threshold distance, $d_{th}$, which is defined as the minimum distance that a user needs to move to find at least one available AP with a probability $\xi$ (in the range of 0 to 1), i.e., $$1 - Poi(n_{ap} = 0) \geq \xi \quad (5)$$

$$\Longleftrightarrow e^{-2\rho R d_{th}} \geq 1 - \xi$$

$$\Longleftrightarrow d_{th} \geq -\frac{\ln(1-\xi)}{2\rho R} = -\frac{\pi R \ln(1-\xi)}{2E[n_{ap}]},$$

where $n_{ap}$ is the number of available APs detected by a previous scan. The last formula is based on the relationship $E[n_{ap}] \approx \pi R^2 \rho$. and $\dot{E}[n_{ap}]$, which can be estimated using the exponential weighted moving average (EWMA) as well known in the art. FIG. 9B shows the threshold distance in formula (5) for different AP density. For example, if the average number of AP is 2 and $\xi$ is set to 0.3, then the threshold distance is 56 m.

For mobile client operating in disconnected mode as shown in FIG. 4B, the scanning decision is made in each epoch that includes three sequential periods. First, in movement estimation period ($T_m$), a mobile client turns on the accelerometer at the ratio of given duty cycle (e.g., 1 sec out of 10 sec). Once the mobile host estimates user activity, it updates the distance ($\hat{d}$) and decides whether or not to trigger the AP scanning in the scanning decision period ($T_d$). Once it detects a set of APs, it the select an AP based on a selection criteria and associates with the selected AP, otherwise it updates the AP density and repeats the process.

To understand the impact of the distance threshold on the energy consumption, the number of scans required for fixed-period and movement-based triggering method, until an AP is detected, is analyzed. In movement-based triggering method, the AP scanning is triggered only when a mobile host moves a certain distance, whereas the fixed-period triggering method triggers the AP scanning at a predetermined time interval.

The number of scans required for fixed-period triggering method is given as:

$$n_{scan}^p = \frac{1}{T_s}\left[t_{still} + \sum_{k \in \kappa} \frac{d_k}{v_k}\right],$$

whereas the number of scans required for movement-based triggering method is given as:

$$n_{scan}^m = \left[\frac{d}{d_{th}}\right],$$

where $t_{still}$ is the amount of time during which the user was stationary, and $d = \Sigma_{k \in K} d_k$ is the distance traveled until detecting a new AP, and where $d_k$ is the distance traveled by activity k (e.g., walking or running).

Figure 9C:
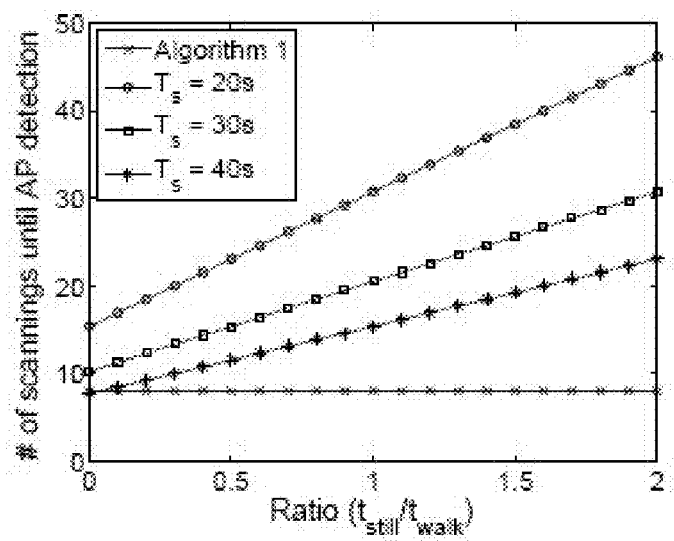
FIG. 9C depicts the energy conservation provided by the movement-based scanning according to the invention, when compared to conventional fixed-frequency triggering with fixed triggering interval (Ts)

FIG. 9C shows the total number of scans when a mobile client 110 repeats walking with pausing (stationary) until it finds an available AP. It is assumed that the AP is located d=500 m away from the disconnected point and $d_{th}$=80 m. The figure shows that as the mobile client remains stationary for more time, the number of required scans increases for fixed-period triggering. By contrast, movement-based triggering is not affected by the stationary time since it triggers scanning only when the mobile client's movement is over the threshold distance. Note that when the user is walking, the movement algorithm triggers scanning once every $$\frac{\bar{d}_{th}}{v_{walk}} \approx 38.5 \text{ s}.$$

Access Point Sensing in Connected Mode

FIG. 4C describes an AP sensing method that controls scanning, probing, and migration when the mobile client operates in the connected mode.

To exploit the diverse Wi-Fi access opportunities, the sensing process adaptively changes the RSS threshold based on the local AP density estimated using moving average. When the AP density is high, mobile client 110 becomes more aggressive in triggering the AP scanning process by setting a high RSS threshold, expecting to find better APs at the cost of scanning overhead. To avoid high false-triggering rate due to fading induced RSS fluctuations even when the mobile client is stationary, the mobile client triggers scanning in a probabilistic manner based on its movement. Specifically, the triggering probability (i.e., $P_{scan}$ at line 18 in FIG. 4C) increases, based on the distance (d) that the mobile client has traveled since the most recent scanning. Here, Δ is set to 0.1 and unit distance ($d_{unit}$) 10 meter in our experiments.

Once the sensing is triggered, if the mobile client discovers any available APs via scanning, then associates with one of the available APs the one that provides the highest estimated bandwidth. If, on the other hand, no usable AP is discovered, the mobile client switches to the disconnected mode depicted in FIG. 4B.

According to this embodiment, when the mobile client is currently connected to an AP of wireless network 106, it still proactively seeks other or better wireless access opportunity to maintain connectivity. For instance, as a mobile user walks within an urban area, where many access points exist and their performance are heterogeneous. Then, the mobile client can identify and use (or migrate to) such opportunities in an energy efficient manner.

The AP sensing process in connected mode includes three main components (i.e., scanning, probing, and selection). Specifically, to exploit the diverse access opportunity while minimizing the false-triggering, the scanning triggering threshold (received signal strength threshold) is dynamically adapted based on the movements or movement history of the mobile client and local AP density. For example, when a user is stationary, even if the RSS is low due to temporal link quality variations, a mobile client refrains from triggering the AP sensing process. However, when a mobile client has moved a certain distance (e.g., 20 m), it not only observes the degraded RSS but also expects to find more APs, and thus triggers the AP sensing process.

Access Point Selection

Once a mobile host finds a set of available APs via scanning, it selects one of the APs based on a performance-based AP selection scheme, which seeks to provide the optimal end-to-end throughput performance for the mobile client. The access point selection is provided by association module 248 or 286.

In general, the mobile client 110 estimates an end-to-end bandwidth by exploiting quality and load information available in the network. In wireless mesh networks, achievable throughput of a mobile host depends on both the quality of the client-AP link and the mesh backhaul links. Here, the client-AP link quality depends more on user mobility, whereas the mesh backhaul performance is closely related to network traffic conditions. Therefore, the available bandwidths for the last hop (client-AP link) and the mesh backhaul are estimated separately. The EAB is estimated by identifying the bottleneck link along the path from the client to mesh gateway. Specifically, each AP and the mesh routers periodically measure the available bandwidth of their outgoing links, and each AP collects the measured information along the path from itself to a gateway and, then, derives the EAB. This information is then delivered to the mobile client to facilitate selection of the best AP for association.

Estimation of Available Bandwidth of Mesh Backhaul

To avoid additional measurement overhead, AP sensing makes use of existing measurement results in a passive way. Consider a link i and denote m as the source node for downstream traffic. Then, node m can estimate the available airtime on link i by passively monitoring the packet transmission time ($t_{tx}$), link busy time ($t_{busy}$), and link idle time ($t_{idle}$) during the measurement period (t, t+T) where $T=t_{tx}+t_{busy}+t_{idle}$. Then, the available bandwidth on link i can be estimated as:

$$AB_i = \left(1 - \frac{t_{tx} + t_{busy}}{T}\right) \cdot R_{m,i},$$

where $R_{m,i}$ is the maximum date transmission rate that node m can support on link i, which can be calculate a priori by performing simple calibration experiments. The estimated available bandwidth calculated above includes the impact of channel contention among the neighboring links operating on the same channel. Each mesh node keeps updating the available link bandwidth by taking a moving average.

Estimation of Available Bandwidth of Client-AP Link

Next, to calculate the available client-AP bandwidth, APs keep estimating their own link utilization as:

$$U_a(t, t+T) = \frac{1}{T} \sum_{c \in C} \frac{L_{a,c}(t, t+T)}{R_{a,c}},$$

where C is the set of clients associated with AP a, $L_{a,c}$ is the load (i.e., amount of traffic) generated by user c ∈ C on AP a, and $R_{a,c}$ is the maximum achievable transmission rate (when there is no contention) by the user c. The AP can estimate the load $L_{a,c}$ by monitoring the total number of bytes transmitted per second to each client associated to it. Here, the utilization $U_a$ can be interpreted as an estimate of the fraction of the AP's capacity that is being used to serve the existing clients associated to the AP. Hence, the remaining capacity is available for the new client n, which is given as:

$$AB_{a,n} = (1 - U_a) \times R_{a,n};$$

where $R_{a,n}$ is the transmission rate between AP a and the new client, which can be estimated during the AP scanning process.

Figure 10:
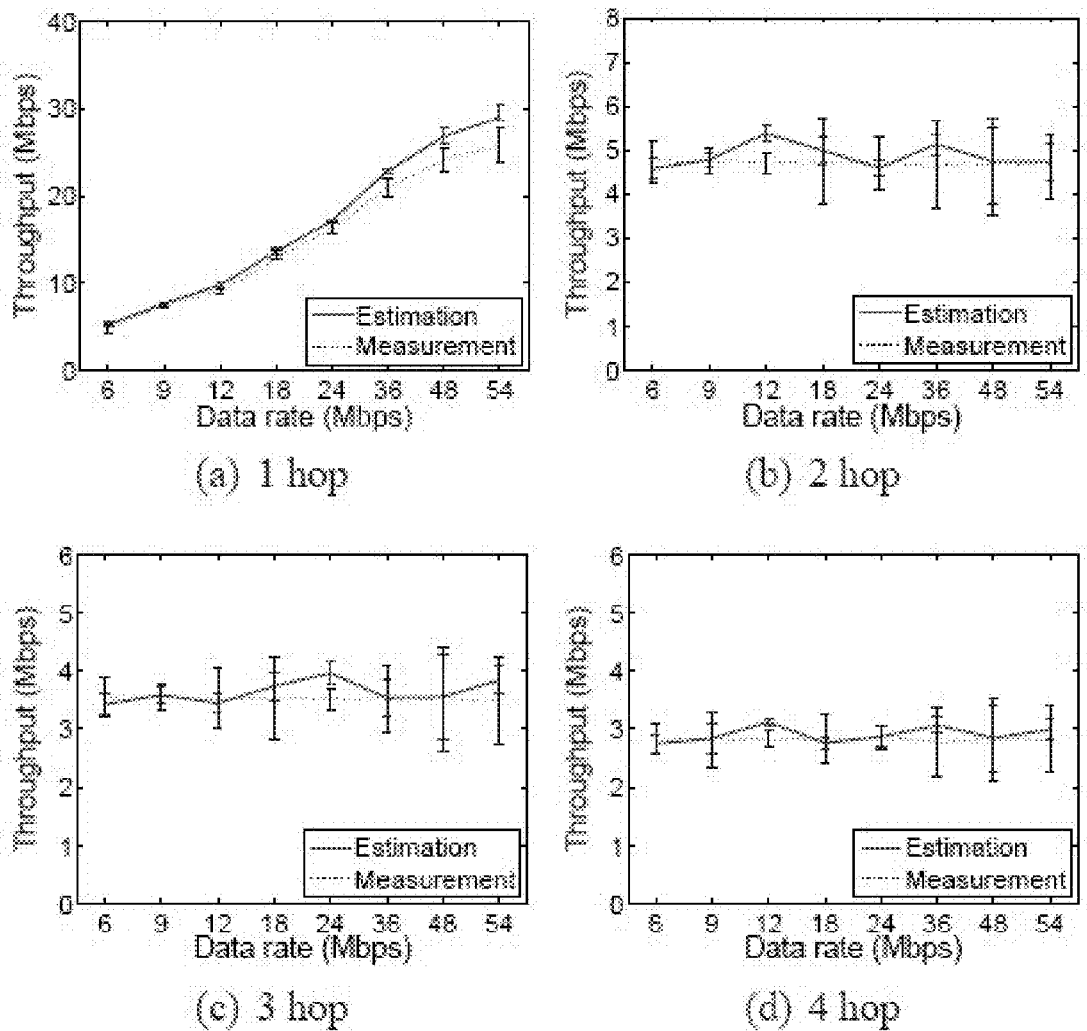
FIG. 10 depicts the accuracy provided by the passive probing estimation of link bandwidth according to the invention.

FIG. 10 shows the estimated available link bandwidths (represented by solid lines) for single-hop, two-hop, three-hop, and four-hop connections compared with actual bandwidth (represented by dotted lines) measured using Thrulay's method available at http://shlang.com/thrulay, which is hereby incorporated by reference in its entirety. FIG. 10 indicates that simple estimation method provides reasonably accurate results with less than 10% error, while eliminating the need to active probing (and its overhead).

Access Point Selection Based on Link Quality and Load Balance

According to another embodiment, mobile client 110 considers both link quality and load balance of the backhaul wireless network 106 into the access point selection scheme.

Specifically, three separate measurement components are incorporated into the AP selection scheme, including:

The channel quality between client 110 and each available AP;

The performance of the backhaul path in wireless network 106 between the desired AP and the mesh gateway 102, if client 110 attempts to access external network 114, or another access point, if client attempts to access another network entity within wireless network 06; and Information of load characteristic of the wireless network 106.

Access points that have more congested routes to the gateway node, which might not always be reflected by the performance or quality parameters, should be given lower priority by the AP selection scheme.

The following description assumes mobile client 110 seeking network connections to external network 114 through edge gateway 102. The AP selection technique can be easily adopted for accessing the internal network entity within wireless network 106.

In order to select an AP based on performance as well as load characteristic of backhaul wireless network 106, client 110 is configured to estimate the channel condition between itself and the available APs, as well as the network performance within mesh backhaul 106. In addition, client 110 gathers the required information as efficiently as possible, while introducing the least possible amount of overheads. The measurement process should neither significantly impact the network resources, nor should result in excessive energy consumption at the client device. On the other hand, wireless network 106 itself facilitates the AP selection process in order to load-balance the network traffic and avoid congestion, thereby improving the overall network performance and utilization.

In one embodiment, the APs detected by client 110 provide the client with link quality information that reflects the performance of their route to the mesh gateway 102. In order to avoid the overheads of implementing a measurement framework, the link quality metric available from the underlying routing protocol is utilized for this purpose. In addition, in order to avoid uneven load distribution and route congestion, network load information is further incorporated in the decision making process. These two factors, along with the channel quality of the client-to-AP link, are taken into consideration by each clients 110 before making the AP selection decision. Such an approach is also supported by the newly proposed IEEE 802.11k draft available at http://www.ietf.org/rfc/rfc3626.txt, which is hereby incorporated by reference in its entirety. Further, for multi-radio multi-channel wireless mesh network, the effect of channel diversity is incorporated in the AP selection process.

As depicted in FIG. 1, after scanning and detecting available APs by using the AP scanning methods described, new client 110B needs to associate with one of the several possible choices of APs. From the end user's perspective, the AP that can provide the best end-to-end throughput or delay will be the best choice. However, from network 106's perspective, it is also desired to evenly distribute the network traffic (or load) across network 106, to achieve better network utilization. In order to help the client in making the right decision, network 106 provides the client 110B with necessary metrics such as the expected throughput of the client, load of the available backhaul paths, and others. Based on these, the client device 110B calculates a score associated with each AP, which is indicative of a measurement of the expected performance that the client 110B can achieve if it associates with that AP. The client 1108 then ranks the various APs using this score, and associate with the best available AP.

In this embodiment, each AP only makes available the necessary network statistics to the client device, and leaves the final AP selection decision to the client. Unlike existing systems, no association control is provided by network 106 in this embodiment, where the network 106 does not decide which AP the client 110B can be associated with, or force the client 110B to roam in search of better APs.

The AP selection technique has the following features:

Network-assisted AP selection: In wireless network 106, which is generally a wireless mesh network, each client 110 needs to be aware of the conditions in the mesh backhaul, in order to make an informed AP selection decision. Rather than making the clients 110 obtain this information by performing end-to-end active probing, which is very expensive both in terms of network resources and energy consumption, system 100 utilizes network 106 to provide the necessary information to the clients.

Low-overhead network monitoring: In order to reduce measurement-related overheads, the network 106 performs passive measurements to collect the necessary information. This information is then exchanged among the various mesh nodes or APs for a distributed. AP selection scheme, or reported to a centralized controller.

Load-balancing in mesh backhaul: Several metrics such as estimated throughput, packet loss rate, and others, are used to estimate the performance of the mesh backhaul. However, such metrics usually tend to select APs with higher throughput, leading to an uneven traffic distribution in the mesh network and decreasing the overall system performance. The AP selection technique described herein incorporates some form of load-balancing metric in the AP selection process.

Impact of hop count and channel diversity: In order to correctly incorporate the performance of the mesh backhaul in the AP selection process, the impact of the number of hops and the channel diversity on the user's performance are taken into account. The AP selection metric described herein accounts for both parameters.

According to a further embodiment, when performing the AP selection, new client 110B determines various metrics, which are indicative of the connection performance and load characteristic of backhaul wireless network 106. These metrics includes the channel quality metric of the wireless link between the client and the AP, the performance metric of the backhaul route between the AP and the edge gateway, and the load-balancing metric of the backhaul wireless network. Each of these metrics is further described hereinafter.

Channel Quality between Client and AP

This metric indicates the performance of the first wireless hop between the client device 110B and the mesh AP. In one embodiment, it is assumed that majority of the traffic flows from the mesh APs to the clients, in the downlink direction. Hence, only the downlink channel quality from the AP to the client is estimated. Alternatively, both downlink and uplink channel qualities can be taken into account.

In general, the link quality between client 110B and a desired AP is measured by the estimated throughput metric. Specifically, consider an AP a, that has a set of clients U associated with it. Let $L_{a,u}$ be the load generated by each client u∈U on AP a per unit time. If $R_{a,u}$ is the maximum transmission rate achieved by each client, then the utilization of AP a is defined as:

$$\mu_a = \Sigma(L_{a,u}/R_{a,u}) \text{ for all } u \in U$$

This utilization is an estimate of the fraction of the AP's capacity that is being used to serve the existing clients. Hence, the remaining capacity is available for the new client 110B, and can used to estimate the downlink throughput between the AP and the client. If R denotes the transmission rate between AP a and the new client, then the estimated throughput of the downlink is given by:

$$\text{Thr}_{downlink} = (1-\mu_a) \times R \tag{6}$$

This value is made available by the respective AP's to the client 110B during the scanning process.

Performance of Backhaul Route between AP and Gateway

System 110 provides a network performance metric, which is indicative of the performance of the client's flows within the mesh backhaul network 106. By incorporating this metric, system 100 considers the situation where even if the client-to-AP link is good, the route between that AP and the gateway node may suffer from poor link quality, and thereby assigning a low priority to the respective AP.

Unlike existing schemes which relies on a measurement framework that involves extra measurement and communication overheads that may adversely impact the end users' performance, system 100 utilizes underlying routing protocols for wireless mesh network 106, which already employs some form of link quality estimation. This metric can be, for example, the Expected Transmission Count (ETX) metric in the Optimized Link State Routing Protocol (OLSR) available at http://www.ietf.org/rfc/rfc3626.txt, or the air-time metric proposed in the IEEE 802.11s standard, which is hereby incorporated by reference in their entireties. When network 106 exposes these metrics to the clients 110, then the clients can estimate the performance of the backhaul paths with wireless network 106 and incorporate the same in the AP selection process.

In one embodiment, wireless 106 utilizes the OLSR routing protocol and exposes the ETX metric to the client devices 110. Each AP keeps track of the cumulative path ETX value for its route to the gateway node. Additionally, the cumulative ETX is modified in order to include channel diversity. As shown in FIG. 1, for a path 116 through wireless network 106, the cumulative ETX is defined as follows:

$$ETX_P = (N/N_j) \times \sum_{i=1}^{n} ETX_i \quad (7)$$

where N is the total number of hops on P and $N_j$ is the number of different channels used by the hops on path P. The fraction $N/N_j$ acts as a weight assigned to each path. If two paths have the same number of hops, then the path with better channel diversity will be given a lower weight. This is because if multiple hops along a path are on the same channel, then only one of the hops can access the channel at a time. Hence the effective throughput of that path will be reduced, even though the individual links may have good ETX values. The cumulative ETX values of such paths are penalized by a larger weight. Alternatively, wireless network 106 can utilize routing protocols with metrics, which already include channel diversity information, such as Weighted Cumulative Expected Transmission Time (WCETT) described in non-patent literature, R. Draves et al., "Routing in Multi-Radio, Multi-Hop Wireless Mesh Networks," in Proceedings of the 10th Annual International Conference on Mobile Computing and Networking, pp. 114-128, 2004, which is hereby incorporated by reference in its entirety.

Load Characteristic Metric

Different APs within network 106 offer different levels of performance to the clients 110. Existing systems, which favor APs that provide a higher throughput path to the client, cause load imbalance in the mesh network. In order to avoid this load imbalance, system 100 utilizes node utilization as an indication of the network load within wireless network 106. For a given path between the AP and the gateway 102, the bottleneck hop is estimated.

Specifically, consider a mesh node (an access point) m that has n backhaul links. Let $L_{m,i}$ be the load generated by node m on link i per unit time, and $C_{m,i}$ be the maximum transmission capacity. Then the utilization of node m is defined as:

$$\mu_m = \sum_{i=1}^{n} (L_{m,i}/C_{m,i})$$

$C_{m,i}$ is a constant value for each node, depending on the current modulation rate of that node. It is calculated a priori by performing simple calibration experiments. $L_{m,i}$ is estimated by monitoring the total amount of data currently being transmitted by the node. Each node within wireless network 106 keeps a moving average of its respective utilization value with respect to time. Now, for a given path 116 through wireless network 106, suppose that each hop is assigned one out of k available channels. Then, Uj is defined as:

$$Uj = \sum_{hop\ i\ is\ on\ channel\ j} \mu_i\ 1 \le j \le k$$

Thus, $U_j$ is the sum of the utilizations of all the nodes on path 116 that are on the same channel j. Then, for path 116, we define the bottleneck utilization as:

$$U_P = \max Uj\ \text{for all}\ j \in (1 \ldots k) \quad (8)$$

Thus, if different hops on a path use different channels, then the hop with the maximum utilization will be the bottleneck hop. However, if multiple hops on a path use the same channel, then the transmissions on these hops will interfere with each other (except for the case of very long hops). In such a scenario, clients 110 sum the individual utilizations of all the hops on the path that are on the same channel. The path with the lowest bottleneck utilization $U_P$ will be given the highest preference, as this will help in achieving a more load-balanced network.

AP Selection Score

Upon determining the metrics, clients 110 combine the above three parameters into a single score, based on which the clients can rank various APs and make a decision. Each client 110 utilizes the following three ranks that are associated with the three parameters to be measured.

$Rank_{AP}$: For each AP that the client detects, the client assigns it a rank on the basis of the estimated downlink throughput from each AP. The AP that can provide the maximum downlink throughput is assigned the highest rank. The estimate of the downlink throughput involves both the load on the APs, and the current channel conditions or link quality (in terms of transmission rate being used). Hence, it provides an accurate estimate of the downlink channel quality.

$Rank_{path}$: For each AP, clients 110 will also obtain the performance of the backhaul path from the AP to the mesh gateway. In this embodiment, this performance is based on the value of the modified ETX metric described in formula (7). By choosing the AP that has the lowest cumulative path ETX value, the client 110B effectively chooses the AP with a high-throughput backhaul route. This approach allows clients 110 to choose a backhaul performance parameter independent of the routing protocol. For example, if the underlying protocol utilizes some other link quality metric, such as the air time metric proposed in IEEE 802.11s protocol, each AP can calculate the cumulative air-time required to transmit the user traffic from the AP to the mesh gateway, and report this to clients 110.

Rank$_{load}$: Each node/access point 104 in the mesh network 106 measures its respective utilization according to formula (8) and exchanges this information with other network nodes. Each AP 104 can then identify the bottleneck node along its route to the mesh gateway 102. When a client 110 scans for APs, the APs report this parameter to the client. Based on this parameter, the client 110 can assign a rank to each AP 104, with the best AP being the one that has the minimum bottleneck utilization along its backhaul route. Note node utilization rather than link utilization is used as an indication of AP load. This is because in order to load-balance the network 106, all the traffic going through a node and not just the traffic on a particular link needs to be considered.

The advantage of assigning ranks based on these metrics is that it allows abstraction of underlying metrics. Irrespective of what metrics are used, system 100 can simply use the ranks to calculate the final AP score. This enables system 100 to use more relevant metrics for different measurement goals. For example, system 100 can use throughput to estimate the channel quality between the AP and the client, while using node utilization to estimate the network load.

The Rank$_{AP}$ and Rank$_{path}$ are aimed at maximizing the client throughput and hence provide the best end-to-end performance. Using these two ranks, the client 110 can choose the AP with the best estimated throughput between the client and the AP, as well as with the best path in terms of backhaul performance. The Rank$_{load}$ metric, however, aims at achieving uniform traffic distribution in the mesh backhaul, by taking into account the individual mesh node utilizations. Combining these ranks allows client 110 to choose the best AP that serves both the goals of providing the best end user experience, while achieving load-balancing in the mesh backhaul wireless network 106. The following equation is used to combine these parameters and calculate the final AP score:

$$AP_{score} = \omega_1 \times (Rank_{AP} + Rank_{path}) + \omega_2 \times Rank_{load} \quad (9)$$

where $\omega_1$ and $\omega_2$ are weights assigned to each term, and take values in the range 0 to 1. Assigning different weights to the two terms allows system 100 to achieve a balance between the two contradictory goals of always choosing the best AP in terms of end-to-end throughput, and load-balancing the traffic across the mesh network.

Figure 5A:
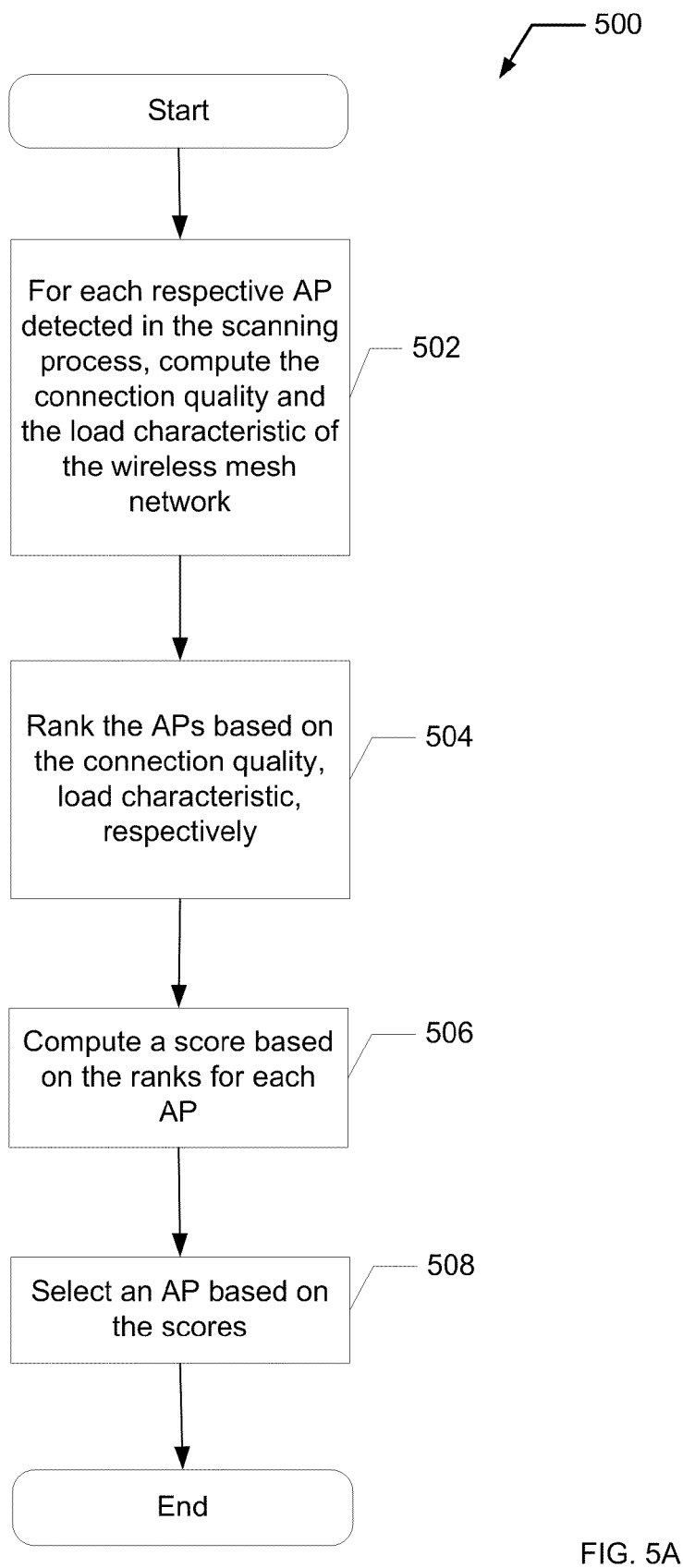
FIG. 5A depicts a flow chart of a method for selecting an access point to access the wireless network depicted in FIG. 1.

According to another embodiment as depicted in FIG. 5A, a method 500 is provided for selecting an AP for a mobile client 110 to access wireless network 106 based on both connection quality and load characteristic of the wireless network. In particular, for each AP that is detected by the AP scanning process, client 110 collects and computes the information of the connection quality and load characteristic of the respective path through wireless network 106 (502). Client 110 then ranks all of the detected APs based on the connection quality and load characteristic (504) and computers a score for each detected AP from the resulting ranks (506). Finally, client 110 selects an AP to access wireless network 106 based on the scores (508).

FIG. 5B depicts a further embodiment of the AP selection method 500. As shown in FIG. 5B, the client device 110 first scans for the available APs by using the AP scanning process, and selects the top three AP based on signal strength measurements. Thereafter, the client 110 obtains the various measurements associated with each AP. Using these measurements, the client device 110 can then rank each AP, and finally estimate the AP score using formula (9). Once the client has calculated the above AP$_{score}$ for each AP, the client 110 can make the association decision.

According to another embodiment, when the client 110 is connected to the wireless network 106, it periodically scans the channels and obtains a new set of measurements for each of the three metrics from the neighboring APs. Based on these new measurements, the client 110 can update its AP scores and switch over to a new AP based on the new scores.

Implementation Details

Mobile Client

FIG. 2B depicts a schematic diagram of the structure of the mobile client 110. These structures can be adapted to any mobile platform.

In one embodiment, the structure depicted, in FIG. 2B can be implemented as a middleware program. The advantages of such an implementation include (i) application transparency, (ii) no need for system upgrade or painful recompilation, and (iii) each use or interaction across different components (e.g., sensor hardware). FIG. 2B depicts four major components to provide the various functions described above.

Mobility Module 284: Mobility Module (MM) 284 periodically monitors mobile client's movement based on sensor or accelerometer's samples. MM 284 periodically turns on the accelerometer for a pre-determined epoch (e.g., 1s-on and 4s-off). Based on the collected samples, MM 284 applies Goertzel's signal processing technique to classify activities of mobile users.

Scanning Module 285: Scanning Module (SM) 285 aims to perform periodic and on-demand AP scanning tasks. When SM 285 gets a disconnection notification from underlying wireless network interface card, it calculates and uses an optimal scanning frequency based on at least the measured AP node density and client movements as described above. Next, SM 285 triggers on-demand scanning in connected state. Whenever other modules request scanning, it first checks for a recent scan result. If a cached result exists, SM 285 passes it to the requesting module. Otherwise, it immediately triggers a new AP scanning process.

Association Module 286: Association Module (AM) 286 includes network monitoring and AP selection functionalities as described above. For network monitoring, AM 286 makes use of network condition information available from wireless nodes. It first sends a path condition request message to a set of APs, selected from the scanning based on RSS information. Each AP replies back to the client with network information of the path from a mobile client to the gateway. Such monitoring and message delivery technique have been implemented within an OLSR plug-in running on the mobile client. AM 286 utilizes the existing control messages of OLSR to exchange such information among the mesh nodes. Such information exchange can also be made available using IEEE 802.11k protocol, as described in non-patent literature, E. G. Villegas et al. "Load balancing in WLANs through IEEE 802.11k mechanisms." In *Proc. of the IEEE ISCC*, 2006, which is hereby incorporated by reference in its entirety. When a client performs the AP selection process, it simply sends a GET query message to the desired APs.

Migration Module 287: Migration Module (MI) 287 performs proactive migration of AP association as described above. Even when a mobile client is connected to an AP, MI 287 dynamically changes the migration triggering threshold by using client's movement information and the AP density. In addition, MI 287 takes AP density and average RSS into account to dynamically adapt the migration threshold. While a mobile client moves around, MI 287 calculates a moving average of recent AP density utilizing historical AP density data. Then, if the density and RSS increases, MI 287 lowers the migration threshold for the client 110 to find a better AP, and vice versa.

Mesh Router

In order to gather certain network statistics from the mesh APs for AP selection, the first metric is the modified cumulative path performance value for each AP. In one embodiment, the underlying OLSR routing protocol is implemented in each AP. The cumulative ETX value described in formula (7) of each AP's path to the mesh gateway is provided by the routing protocol and integrated with the channel information for each node. Each mesh AP can then calculate the modified ETX value for its path to the gateway node, and make this value available to the client device during the AP scanning phase. As the link quality varies, or if the routing protocol chooses a new path, the AP can calculate the new modified ETX value.

In order to estimate the node utilization, one, embedment provides a modified Madwifi driver for each AP. Each AP keeps track of the total number of bytes being transmitted by that AP to all its neighbors and keeps track of the maximum amount of data that the AP can transmit to its neighbors at any given instant of time (capacity). The OLSR TC message is modified to add a field to carry the utilization value for each node, thus avoiding the overhead of transmitting extra packets. In this manner, each AP receives the utilization information of all the other APs in the mesh network 106. Then, based on formula (8), each mesh node can estimate the bottleneck utilization for its path to the mesh gateway 102. This information is also made available to the clients and is used to estimate the $Rank_{load}$ metric.

The final metric that needs to be provided is the channel quality between the client and the APs. In one embodiment, it is assumed that most of the traffic flows in the downlink direction from the mesh gateway to the clients, since most servers currently reside on the external wired network. In this embodiment, only the downlink channel quality between the APs and the clients is estimated. The estimated throughput metric is used for this purpose. As mentioned above, each mesh AP keeps track of its own utilization, and is therefore also aware of the current transmission rate between itself and the client.

Once provided with these two parameters, the mobile client calculates the estimated throughput in the downlink direction, and use this to rank the APs in terms of their client-to-AP link performance.

According to this embodiment, in order to obtain the necessary information from the wireless APs to determine the $AP_{score}$, a customized OLSR plug-in is implemented on each AP, and keeps track of all the data measured by that AP. Upon receiving a GET request from the mobile client, the OLSR plug-in of each AO responds with the measured statistics.

Performance Evaluation

This section described various experiments designed to evaluate system 100 depicted in FIG. 1. A number of implementations of the system are provided herein according to the exemplary embodiments described above, merely for the purpose of evaluation, and should therefore by no means be used to limit the scope of the invention.

Experimental Setup

Figure 11:
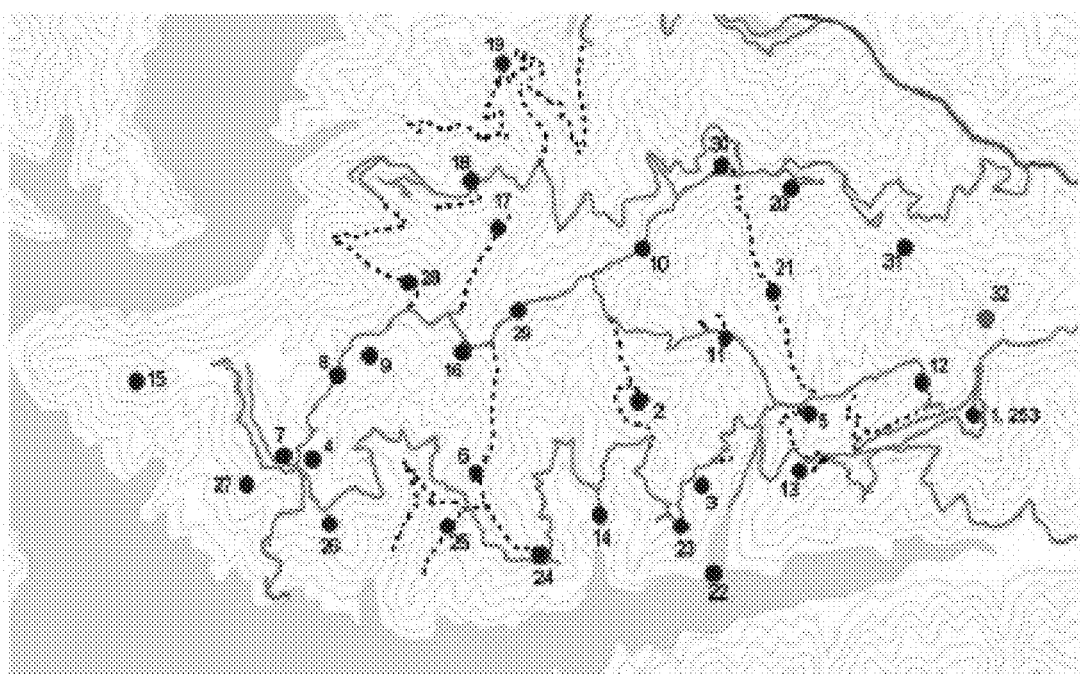
FIG. 11 depicts the outdoor testbed topology used to practice embodiments of the invention.

An outdoor testbed illustrated in FIG. 11 is constructed in a forest reserve, spanning over 2,000 acres of wilderness and hilly terrain. The testbed supports live traffic and is actively used by several researchers. It includes 34 mesh nodes (access points), which are located at 31 physical sites. The average number of visible APs is 8 and the transmission range of the APs is 300 m.

The nodes in the mesh network are built using Soekris net4826 embedded boards. Each node has a 266 MHz 586 processor, 128 MB SDRAM, and flash storage ranging from 64 MB to 256 MB. For the wireless radios, each board is equipped with two Atheros 802.11b/g Mini-PCI cards. Radios running on 802.11b/g standard can use three non-overlapping channels. All nodes run a custom Linux distribution using kernel 2.6.28 with a modified wireless device driver. The OLSR routing protocol is used.

The indoor testbed is deployed inside an office building and is composed of 15 APs across two floors. Each mesh includes OpenWRT-based Cambria GW2358-4 boards, a 667 MHz Intel XScale processor, 128 MB of RAM, and 32 MB of flash. Each wireless node supports two radios based on the Atheros chipset, running an open-source Madwifi wireless device driver. One radio on each node is configured in the ad-hoc mode, thus forming the mesh backhaul. These radios use the 802.11a modulation scheme. The other radio on each node is configured as an AP (thus providing client access) and uses the 802.11g modulation scheme. Different channels are assigned to different APs to minimize interference. One of the wireless nodes also serves as the mesh gateway 102 connected to the external network. The OLSR routing protocol with ETX metrics and the default rate-adaptation technique available in the Madwifi driver are used in the testbed.

Experimental Results

Efficiency of Disconnected Sensing: The performance of disconnected sensing technique depicted in FIG. 4B our outdoor test-bed. During the experiment, the mobile client is moved around disconnected areas with different ratios of activities (i.e., standing, walking) for 10 minutes, and the number of scans triggered by the mobile client is measured. For comparison, the number of scans, while changing thresholds of the threshold-based periodic scheme, is also measured.

Figure 12A:
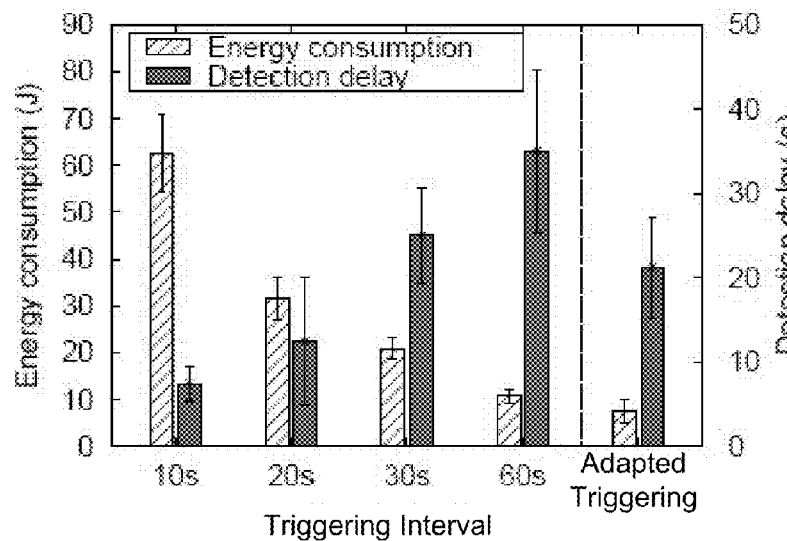
FIG. 12A depicts the performance improvement provided by one embodiment of the invention, as compared with conventional fixed-frequency scanning.

FIG. 12A depicts a comparison between the performances of adapted triggering of disconnected AP sensing depicted in FIG. 4B and the fixed-period AP scanning, in terms of the average energy consumption by the scanning process and delay in detecting an available AP. The threshold distance ($d_{th}$) for adapted triggering was set to 71 m based on the estimated AP density during the experiments. The triggering interval for the fixed-frequency triggering is set to 10s, 20s, 30s, and 60s, respectively. As shown in the figure, the adapted triggering saves scanning energy consumption by up to 60%, compared to the fixed-frequency triggering with a 30s triggering interval, while keeping the AP detection delay at the same level as the fixed-frequency triggering. This benefit is provided by incorporation of movement information in adjusting the triggering interval (or frequency). Specifically, each client 110 calculates an optimal scanning frequency based on distance that a mobile user has traveled. If the distance does not increase, the mobile client suppresses scanning, thus saving energy. At the same time, as the mobile client travel a greater-than-threshold distance, it triggers the AP scanning to detect the access opportunities, thereby reducing detection delay.

Effectiveness of Connected AP Sensing

The effectiveness of the connected mode provided by system 100 is further evaluated. While a mobile client, which is connected to the indoor wireless network, is moved around a certain trajectory in the indoor testbed for 6 minutes, including 3 minutes of walk and 3 minutes of standing, the total amount of energy consumption per minute is measured from the connected mode. For comparison, the energy consumptions of a conventional fixed-threshold system and a benchmark system (denoted as "Oracle") are also measured. Three different fixed thresholds, −55 dBm, −75 dBm, and −95 dBm, are respectively set for the fixed-threshold triggering technique. In the Oracle system, a mobile device is configured to scan channels every two-second for providing very fine-grained measurements and determine the best AP based on the scanning results throughout the experiment. The selected AP is taken as the best selection, and the scanning overhead is ignored.

Figure 12B:
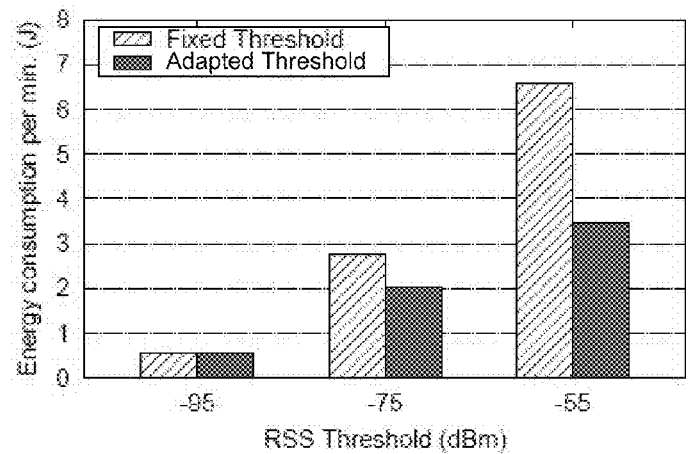
FIG. 12B depicts the energy saving provided by one embodiment of the invention, as compared with conventional fixed-frequency scanning.

FIG. 12B shows the average energy consumption for migration per minute. As shown in the figure, when the client is moved around (the movement scenario), the adapted-threshold technique as described above saves energy by 47%, compared to fixed-threshold migration. This is mainly because the adapted-threshold technique suppresses unnecessary scanning, when the mobile clients are stationary. Furthermore, while saving energy for scanning, the adapted-threshold technique still achieves almost the same level of RSS from associated APs throughout the experiment. Table 1 further shows that the RSS achieved by the adapted—threshold technique is close to that of the "Oracle" technique with different thresholds. For stationary (fixed) scenarios, the adapted-threshold technique also achieves similar level of RSS, while reducing energy consumption by 34%.

TABLE 1

Achieved RSS comparison between fixed-threshold sensing and movement-aware sensing

| Threshold (dBm) | Oracle | Achieved | Ratio (%) |
| --- | --- | --- | --- |
| −55 (fixed) | −60.86 | −63.70 | 95.3 |
| −75 (fixed) | −61.56 | −64.98 | 94.4 |
| −95 (fixed) | −61.04 | −68.76 | 87.4 |
| −55 (movement) | −59.48 | −61.04 | 97.4 |
| −75 (movement) | −59.51 | −64.23 | 92.1 |
| −95 (movement) | −63.28 | −71.91 | 86.4 |

Effectiveness of Dynamic Sensing-Trigger Threshold

Figure 12C:
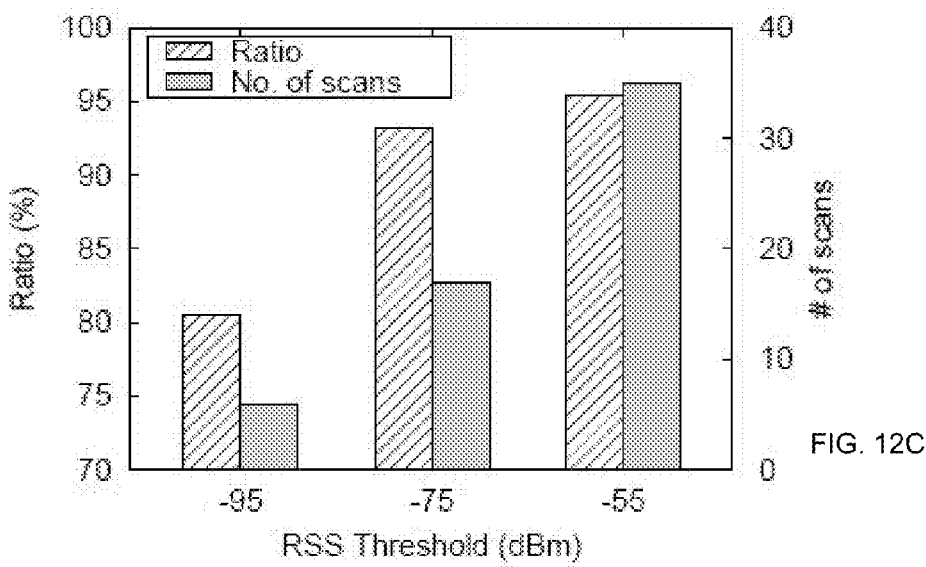
FIG. 12C depicts the performance of density-based scanning with different thresholds.

FIG. 12C shows the effectiveness of the AP density-based threshold adaption scheme. In the experiment, the mobile client is carried by a user walking around various sites (both indoor and outdoor) where the local AP density varied from 5 to 25. First, a set of fixed RSS thresholds is used. The number of scans triggered by the mobile client is counted and the average RSS achieved by the mobile client is compared to the "Oracle" technique, assuming the Oracle technique always selects the best AP without any overhead. The figure clearly shows the tradeoff between the RSS and scanning overhead. With the same experimental setting, the AP density-based threshold adaptation scheme made a good tradeoff, with 94.4% of the RSS while scanning 16 times, because of its ability to dynamically adapt the threshold based on the local AP density.

Evaluation of AP Selection Scheme

In order to further evaluate the AP selection scheme, separate experiments is conducted. The experiments demonstrate how the AP selection scheme utilizes link quality information available from the underlying routing protocols and incorporates load-balancing in the AP selection process as described above.

In the experiment, the client device scans for the available APs, and requests from each available AP the modified cumulative ETX value of that AP's path to the mesh gateway 102. This value is then used by the client as an indicator of the performance of the backhaul path between the AP and the gateway node. The client also obtains the estimated downlink throughput value from each AP, in order to estimate the quality of the link between itself and the AP. Both values are measured passively by the mesh APs as described above, and hence, do not use any of the client resources. The clients make the final AP selection decision by combining these two pieces of data.

Figure 13:
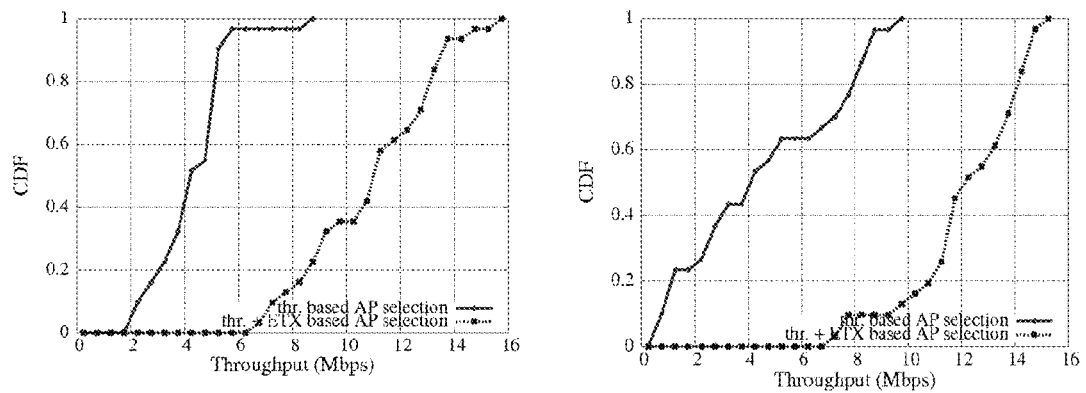
FIG. 13 depicts the throughput improvement provided by one embodiment of the invention, as compared with conventional access point selection scheme.
Figure 14:
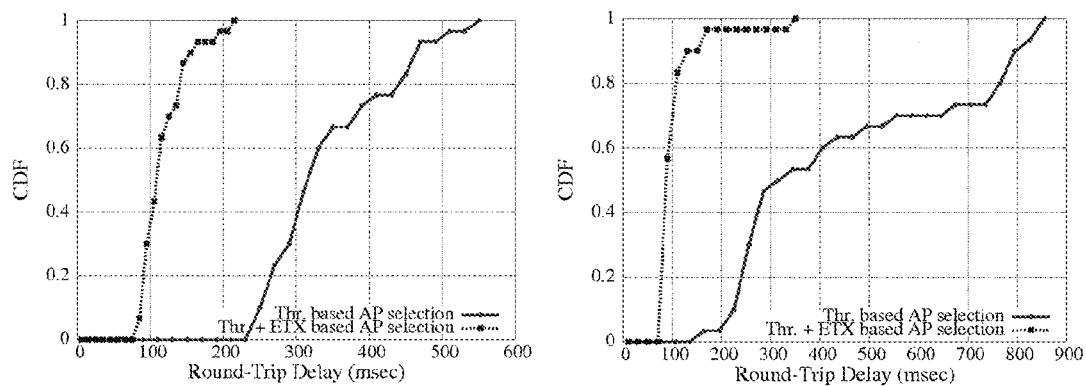
FIG. 14 depicts the round-trip delay improvement provided by one embodiment of the invention, as compared with conventional access point selection scheme.

FIG. 13 shows the CDF of the throughput achieved by the client device at two different locations within the testbed using the AP selection scheme ("thr.+ETX based AP selection") described herein. The figure also shows the client throughput for the case where only the estimated throughput of the client-to-AP link was used for AP selections ("thr. based AP selection"). Throughput gain is because system 100 incorporates the path ETX, which considers the performance of the mesh backhaul wireless network 106 in the AP selection process. A similar improvement was observed in the round-trip time of the client device, as shown in FIG. 14.

A point to note from FIG. 5 is that our AP selection scheme based on utilizing routing protocol metrics achieves performance similar to the scenario where the conventional active scheme is used to estimate the performance of the mesh backhaul. This corroborates that fact that link quality metrics, available from the underlying routing protocols, can be used to estimate the performance of the mesh backhaul.

Figure 15:
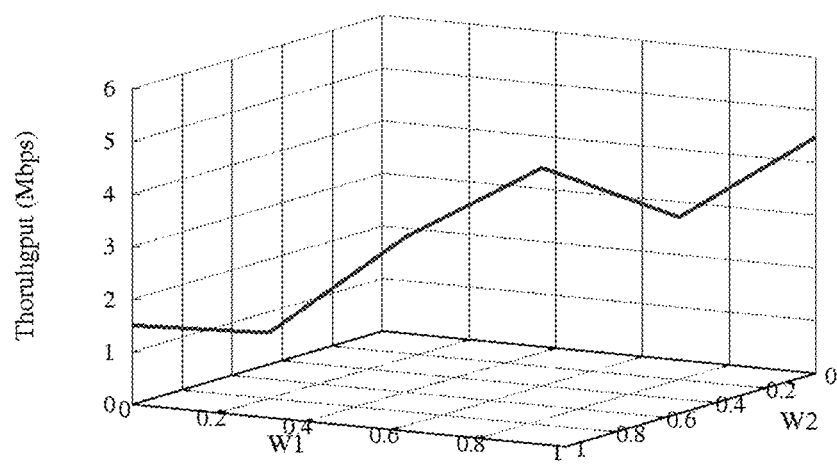
FIG. 15 depicts the effects of weight values $w_1$ and $w_2$ on the throughput performance according to the invention.

As shown in formula (9), two weights $\omega_1$ and $\omega_2$ are used to balance between the throughput and load-balancing in AP selections. FIG. 15 shows the network throughput value for the different combination of the two weights. As shown in FIG. 15, when $\omega_1$ was set to 0, the network performance was degraded. In this case, the client would select the AP with the minimum bottleneck utilization along its backhaul path, irrespective of the throughput that can be achieved on that path. The best performance, in terms of throughput, was achieved with $\omega_2$ set to 0. However, it also achieved the worst performance in terms of minimizing the bottleneck utilization in the mesh backhaul. The performance was observed to improve with increasing value of $\omega_1$, as it gives a higher weight to the "throughput" component. However, this also leads to an increase in the bottleneck network utilization, resulting in uneven distribution of traffic in the network. As a result, these two weights $\omega_1$ and $\omega_2$ can be adjusted to suit the targeted network performance and design requirements.

To evaluate the effect of the load characteristic on AP selections, an experiment is conducted, where the values of 0.6 and 0.4 are assigned to $\omega_1$ and $\omega_2$ to respectively, as these values provide the best balance between achieving higher client throughput, and minimizing the network bottleneck utilization.

Figure 16:
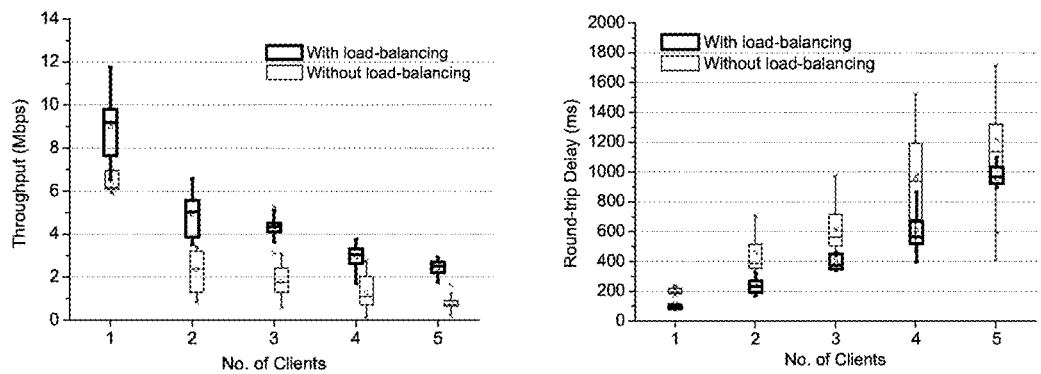
FIG. 16 depicts the throughput and round-trip delay performance provided by one embodiment of the invention practiced in the indoor testbed, when the number of mobile clients is varied.

In order to test the AP selection technique described herein, new clients are introduced into the network in the indoor testbed, at varying locations. The number of new clients was varied from 1 to 5. FIG. 16 shows the performance of the SP selection schemes with and without considering load characteristic of the backhaul wireless network 106. It was observed that with load-balancing, the overall network performance was significantly better, while achieving a more even traffic distribution in the mesh backhaul.

Figure 17:
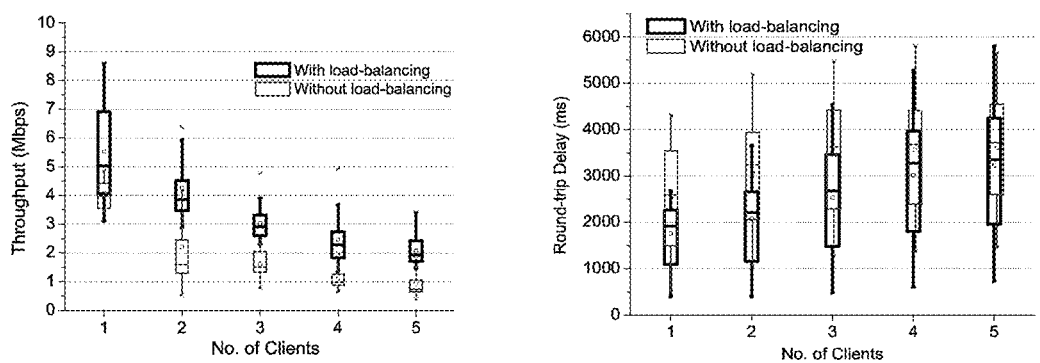
FIG. 17 depicts the throughput and round-trip delay performance provided by one embodiment of the invention practiced in the outdoor testbed, when the number of mobile clients is varied.

The AP selection technique is further tested in the outdoor testbed. Apart from the background traffic already in the network, two more clients are introduced that generated UDP traffic at a constant rate of 3 Mbps. FIG. 17 shows the network performance with varying number of clients. Once again, incorporating load characteristic into AP selections provided significant improvement in terms of both throughput and round-trip delay.

In order to evaluate the impact of the AP selection scheme on the user traffic, the following experiment is further conducted in the outdoor testbed.

Figure 18:
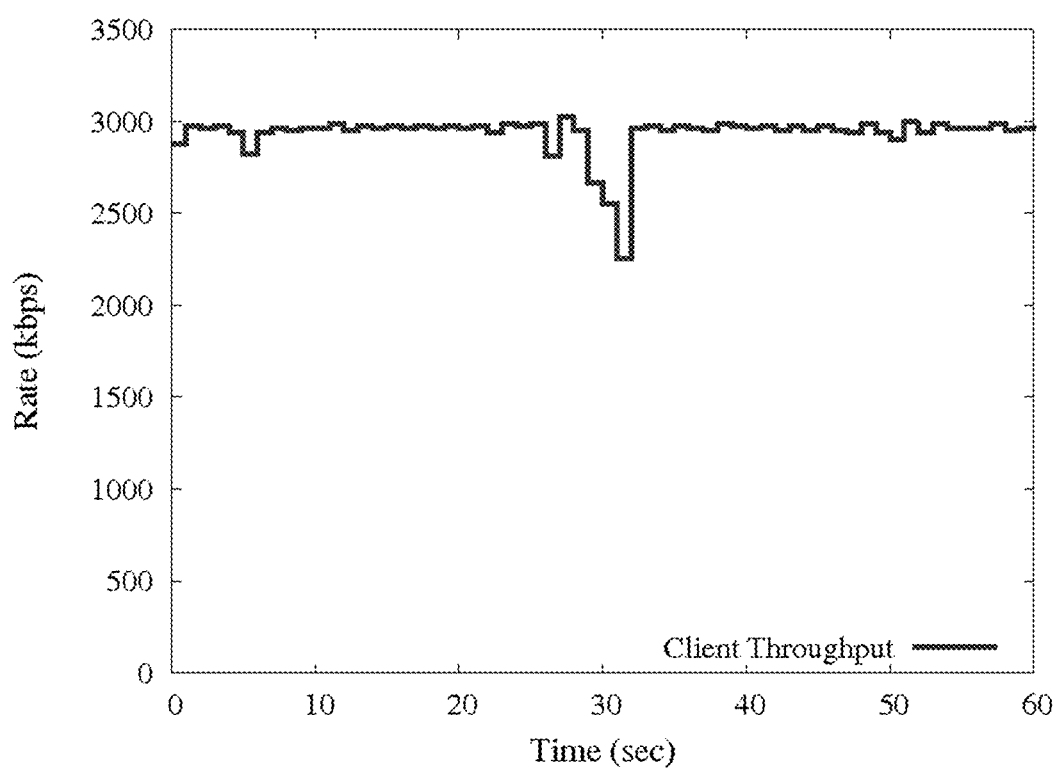
FIG. 18 depicts the impacts of a conventional AP selection scheme on network throughput.

Specifically, two clients generating background UDP traffic at a constant rate of 3 Mbps. A third client is introduced to transmit UDP data to a server attached to the gateway node at a constant rate of 3 Mbps. The network trace is collected at the server using the tcpdump tool for the duration of the experiment. A fourth client is then introduced in the network, which uses the conventional active AP selection scheme and the AP selection scheme described herein. FIG. 18 shows the impact of the active scheme on the existing user's throughput. The TCP upload and download test performed by the new client adversely impacts the throughput of the existing client. The packet loss for the clients currently connected to the network is on average 3.9% more when the newly introduced client uses the conventional active scheme, as opposed to the AP scheme described herein.

While the invention has been particularly shown and described with reference to preferred embodiments thereof, it will be understood by those skilled in the art that various changes in form and details may be made therein without departing from the spirit and scope of the invention.

The invention claimed is:

1. A method for providing a mobile client with a wireless connection to a wireless network, the method comprising:
triggering an access point scanning process in disconnected mode, wherein access point scanning in disconnected mode comprises:
monitoring movement of the mobile client using a low-power sensor disposed onboard the mobile client; and
triggering a disconnected mode access point scanning process based on the mobile client moving more than a threshold distance;
connecting to an access point found by the disconnected mode access point scanning process;
performing access point scanning in connected mode, wherein access point scanning in connected mode comprises:
periodically triggering a connected mode access point scanning process, wherein the connected mode access point scanning process includes a signal strength threshold for potential access points;
monitoring movement of the mobile client using the a low-power sensor disposed onboard the mobile client;
determining an access point density of the wireless network;
adjusting the signal strength threshold based on the determined access point density; and
adjusting a frequency of the periodic triggering based on the monitored movement and the determined access point density.

2. The method of claim 1, further comprising:
decreasing the frequency of the triggering of the connected mode access point scanning process in response to a decrease in the access point density.

3. The method of claim 2, further comprising: increasing the frequency of the triggering of the connected mode access point scanning process in response to an increase in the access point density.

4. The method of claim 1, further comprising:
determining a speed of the movement of the mobile client; and
increasing the frequency of the triggering of the connected mode access point scanning process in response to an increase in the speed.

5. The method of claim 4, further comprising:
decreasing the frequency of the triggering of the connected mode access point scanning process in response to a decrease in the speed.

6. The method of claim 1, wherein the low-power sensor is an accelerometer.

7. The method of claim 1, further comprising:
detecting one or more access points within a region in which the mobile client resides;
monitoring at least a link quality and a load characteristic of the wireless network; and
selecting an access point from the detected one or more access points for connecting the mobile client to the wireless network in response to at least the link quality and the load characteristic of the wireless network.

8. The method of claim 7, wherein the wireless network is a wireless mesh network including a plurality of access points, wherein another network entity is connected to one of the plurality of access points, and wherein each of the detected one or more access points is associated with a path connecting the respective access point and the another network entity through the wireless mesh network, each path having one or more nodes selected from the plurality of access points;
the method further comprising:
determining a connection quality and a load characteristic of each path through the wireless mesh network associated with each of the detected one or more access point; and
selecting the access point in accordance with the connection qualities and the load characteristics of the paths.

9. The method of claim 8, further comprising:
ranking the detected one or more access points based on the connection qualities and the load characteristics of their associated paths through the wireless mesh network; and
selecting the access point in accordance with the ranks.

10. A non-transitory computer readable medium having computer readable cedes stored thereon, when executed by one or more digital processors, instructing the one or more digital process to provide a mobile client with a wireless connection to a wireless network, the computer readable codes including:
instructions for triggering an access point scanning process in disconnected mode, wherein access point scanning in disconnected mode comprises:
monitoring movement of the mobile client using a low-power sensor disposed onboard the mobile client; and
triggering a disconnected mode access point scanning process based on the mobile client moving more than a threshold distance;
instructions for connecting to an access point found by the disconnected mode access point scanning process;
instructions for performing access point scanning in connected mode, wherein access point scanning in connected mode comprises:
periodically triggering a connected mode access point scanning process, wherein the connected mode access point scanning process includes a signal strength threshold for potential access points;
monitoring movement of the mobile client using the low-power sensor disposed onboard the mobile client;
determining an access point density of the wireless network;
adjusting the signal strength threshold based on the determined access point density; and
adjusting a frequency of the triggering based o he monitored movement and the determined access point density.

11. The computer readable medium of claim 10, wherein the low-power sensor is an accelerometer.

12. The computer readable medium of claim 10, the computer codes further comprising:
  instructions for detecting one or more access points within a region in which the mobile client resides;
  instructions for measuring at least a link quality and a load characteristic of the wireless network; and
  instructions for selecting one of the detected one or more access points to connect the mobile client to the wireless network in accordance with at least the link quality and the load characteristic of the wireless network so as to maximize an end-to-end performance of the wireless connection.

13. A. mobile client for connecting to a wireless network through one or more access points, comprising:
  a low-power sensor configured to generate motion signals indicative of movements of the mobile client; and
  a processor, configured for:
    triggering an access point scanning process in disconnected mode, wherein access point scanning in disconnected mode comprises:
      monitoring movement of the mobile client using a power sensor disposed onboard the mobile client; and
      triggering a disconnected mode access point scanning process based on he mobile client moving more than a threshold distance;
    connecting to an access point found by the disconnected mode access point scanning process;
    performing access point Scanning in connected mode, wherein access point scanning in connected mode comprises:
      periodically triggering a connected mode access point scanning process, wherein the connected mode access point scanning process includes a signal strength threshold for potential access points;
      monitoring movement of the mobile client using the low-power sensor disposed onboard the mobile client;
      determining an access point density of the wireless network;
      adjusting the signal strength threshold based on the determined access point density; and
    adjusting a frequency of the periodic triggering on the monitored movement and the determined access point density.

14. The mobile client of claim 13, further comprising:
  an association module configured to monitor at least a link quality and a load characteristic of the wireless network and select an access point to connect the mobile client to the wireless network in accordance with at least the link quality and the load characteristic of the wireless network so as to maximize an end-to-end performance of a wireless connection.

15. The mobile client of claim 13, wherein the scanning module is further configured to monitor a received signal strength of wireless signals received by the mobile client, and the mobile client further comprises:
  a migration module configured to migrate of the mobile client from a first access point to a second access point in response to at least one of the change in the movement of the mobile client, the change in the access point density, and a change in the received signal strength.

16. A system for providing a mobile client with a wireless connection to a wireless network, the system comprising;
  a plurality of access points distributed within the wireless network; and
  a mobile client, configured to for;
  triggering an access point scanning process in disconnected mode, wherein access point scanning in disconnected mode comprises:
    monitoring movement of the mobile client using a low-power sensor disposed onboard the mobile client; and
    triggering a disconnected mode access point scanning process based on the mobile client moving more than a threshold distance;
  connecting to an access point found by the disconnected mode access point scanning process;
  performing access point scanning in connected mode, wherein access point scanning in connected mode comprises:
    periodically triggering a connected mode access point scanning process, wherein the connected mode access point scanning process includes a signal strength threshold for potential access points;
    monitoring movement of the mobile client using the low-power sensor disposed onboard the mobile client;
    determining an access point density of the wireless network;
    adjusting the signal strength threshold based on the determined access point density; and
    adjusting a frequency of the periodic triggering based on the monitored movement and the determined access point density.

17. The system of claim 16, wherein each of the plurality of access point is configured to measure at least a link quality and a load characteristic of the wireless network and configured to transmit the measurements indicative of the link quality and the load characteristic to the mobile client.

18. The system of claim 17, wherein the mobile client is configured to receive the measurements of the link quality and the load characteristic, and when the mobile client detects one or more access points of the wireless network, the mobile client is configured to select one of the detected one or more access points in accordance with the measurements of the link quality and the load characteristic of the wireless network so as to maximize an end-to-end performance of the wireless connection.

* * * * *